(12) United States Patent
Taylor et al.

(10) Patent No.: US 9,438,597 B1
(45) Date of Patent: Sep. 6, 2016

(54) REGULATING CREDENTIAL INFORMATION DISSEMINATION

(71) Applicant: MicroStrategy Incorporated, Vienna, VA (US)

(72) Inventors: Jeff Taylor, Fairfax, VA (US); Siamak Ziraknejad, Reston, VA (US)

(73) Assignee: MicroStrategy Incorporated, Vienna, VA (US)

( * ) Notice: Subject to any disclaimer, the term of this patent is extended or adjusted under 35 U.S.C. 154(b) by 119 days.

(21) Appl. No.: 14/059,635

(22) Filed: Oct. 22, 2013

(51) Int. Cl.
*H04L 29/06* (2006.01)

(52) U.S. Cl.
CPC ..................................... *H04L 63/10* (2013.01)

(58) Field of Classification Search
USPC ............................................................ 726/5
See application file for complete search history.

(56) References Cited

U.S. PATENT DOCUMENTS

| | | | | |
|---|---|---|---|---|
| 8,364,969 B2* | 1/2013 | King | .................... | G06F 21/6254 713/182 |
| 8,793,768 B2* | 7/2014 | Beck | ..................... | G06F 19/322 726/4 |
| 9,130,919 B2* | 9/2015 | Haynes | .................... | H04L 63/08 |
| 2009/0008446 A1* | 1/2009 | Korosec | ......................... | 235/380 |
| 2010/0024023 A1* | 1/2010 | Bair | .................................. | 726/8 |
| 2010/0064359 A1* | 3/2010 | Boss | ....................... | G06F 21/32 726/7 |
| 2010/0209006 A1* | 8/2010 | Grigsby et al. | ............... | 382/218 |
| 2011/0154465 A1* | 6/2011 | Kuzin | ................. | H04L 63/0815 726/9 |
| 2013/0262857 A1* | 10/2013 | Neuman | ................. | H04L 63/08 713/155 |
| 2013/0326596 A1* | 12/2013 | Hohlfeld | ............. | G06F 21/6218 726/5 |
| 2014/0181927 A1* | 6/2014 | Sarkissian | ......................... | 726/6 |
| 2014/0189808 A1* | 7/2014 | Mahaffey et al. | ................. | 726/4 |
| 2014/0289804 A1* | 9/2014 | Drazan | .............................. | 726/4 |
| 2014/0297530 A1* | 10/2014 | Eckel et al. | ..................... | 705/44 |
| 2014/0304183 A1* | 10/2014 | Zabar | ............................ | 705/321 |
| 2014/0304780 A1* | 10/2014 | Kuang et al. | ..................... | 726/4 |

* cited by examiner

*Primary Examiner* — Jeffrey Pwu
*Assistant Examiner* — William Corum, Jr.
(74) *Attorney, Agent, or Firm* — Fish & Richardson P.C.

(57) ABSTRACT

A validating device receives, from a client device associated with a user, a representation for a first credential associated with the user. The validating device validates the representation for the first credential associated with the user based on data derived from the representation for the first credential associated with the user and identification data associated with the validating device. The validating device obtains a first set of data associated with the user and a second set of data associated with the user. The second set of data is different from the first set of data. The first set of data is obtained based on verifying the identification data associated with the validating device. Obtaining the second set of data is independent of verifying the identification data associated with the validating device.

20 Claims, 7 Drawing Sheets

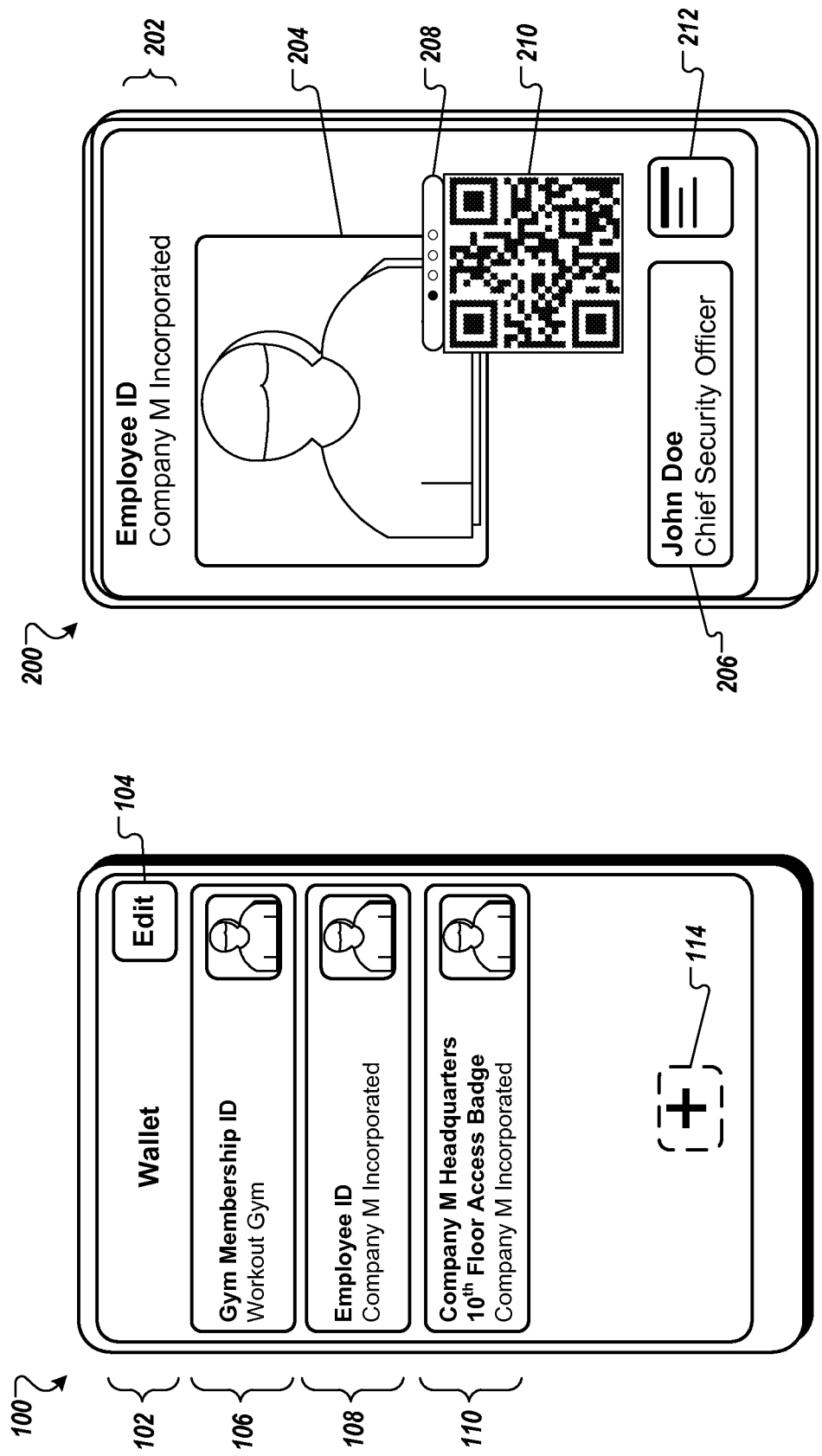

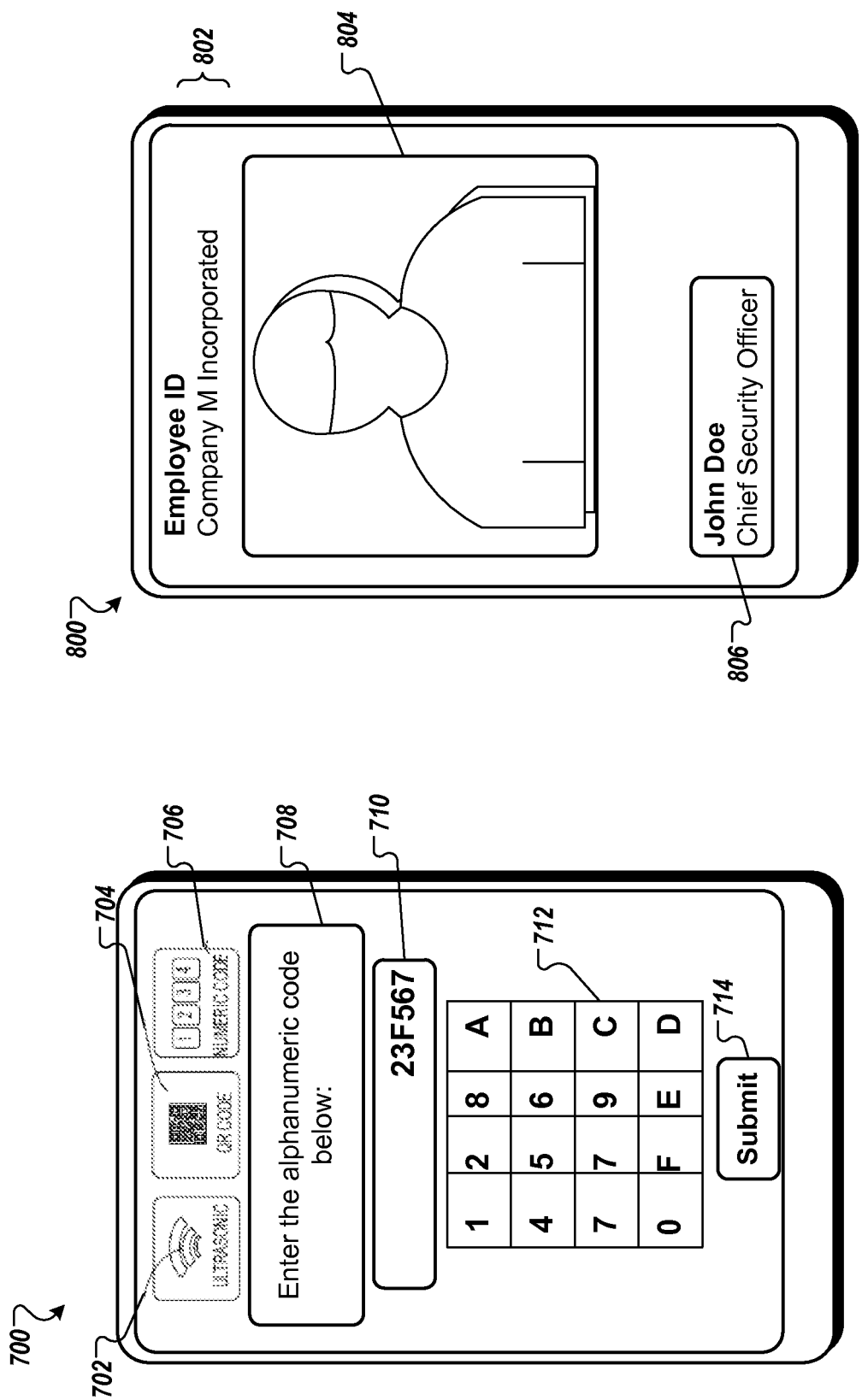

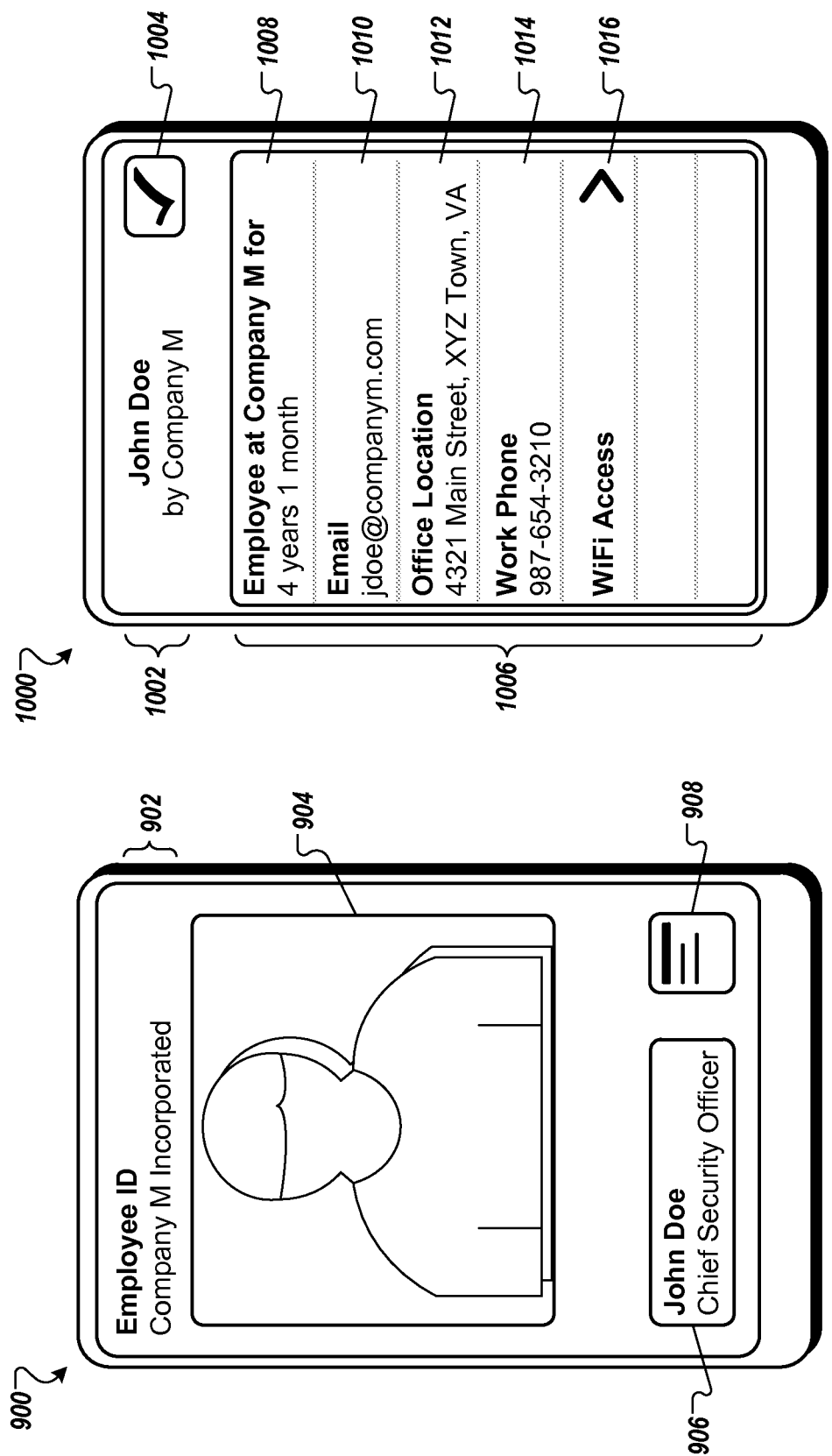

REGULATING CREDENTIAL INFORMATION DISSEMINATION

TECHNICAL FIELD

This specification generally relates to user credentials.

BACKGROUND

A user may be associated with a credential that, for example, permits the user to be identified to others, or to access resources, or both.

SUMMARY

In one aspect, a non-transitory computer-readable medium stores instructions that are executable by one or more processors. Upon such execution, the instructions cause the one or more processors to perform the following operations. A validating device receives, from a client device associated with a user, a representation for a first credential associated with the user. The validating device validates the representation for the first credential associated with the user based on data derived from the representation for the first credential associated with the user and identification data associated with the validating device. The validating device obtains a first set of data associated with the user and a second set of data associated with the user. The second set of data is different from the first set of data. The first set of data is obtained based on verifying the identification data associated with the validating device. Obtaining the second set of data is independent of verifying the identification data associated with the validating device.

Particular implementations may include one or more of the following features. The validating device validating the representation for the first credential associated with the user based on data derived from the representation for the first credential associated with the user and identification data associated with the validating device may comprise sending, by the validating device and to a validation server, a request to validate the representation for the first credential associated with the user. The request may include data derived from the representation for the first credential associated with the user and the identification data associated with the validating device. Obtaining, at the validating device, the first set of data associated with the user and the second set of data associated with the user may comprise receiving, at the validating device and from the validation server, a response comprising the first set of data associated with the user and the second set of data associated with the user.

The representation of the first credential may be presented by a user interface shown on a display coupled to the client device. The representation of the first credential may be selected from the group consisting of an alphanumeric code, optical machine-readable representation, sound signal, and near-field communication signal.

The identification data associated with the validating device may include a second credential that is associated with the validating device. Verifying the identification data associated with the validating device may comprise validating the second credential associated with the validating device.

The first set of data associated with the user may include identifying information corresponding to the user that is designated as private. The second set of data associated with the user may include identifying information corresponding to the user that is designated as public.

A grouping of the first set of data and a grouping of the second set of data may be based on instructions configured by a credential issuing organization associated with the first credential associated with the user. The instructions configured by the credential issuing organization may include information directing a determination of data to be provided to the validating device based on verifying the identification data associated with the validating device.

The instructions may cause the one or more processors to perform the following operations. The first set of data obtained at the validating device may be processed. In response to processing the first set of data, it may be determined that the user is authorized to access a resource associated with the validating device. Access to the resource may be provided based on the determination.

Providing access to the resource may comprise unlocking a door based on a key represented within a portion of the first set of data obtained at the validating device. Providing access to the resource may comprise granting access to an account based on a username and password included in the first set of data. The account may be one of a computer account or a network account.

Providing access to the resource in response to processing the first set of data may comprise retrieving a document based on a document location encoded within a portion of the first set of data.

The instructions may cause the one or more processors to present, using a display coupled to the validating device, the first set of data and the second set of data obtained at the validating device.

In another aspect, a non-transitory computer-readable medium stores instructions that are executable by one or more processors. Upon such execution, the instructions cause the one or more processors to perform the following operations. A server receives from a validating device a request to validate a representation for a first credential associated with a user. The request includes data derived from the representation for the first credential associated with the user and identification data associated with the validating device. The server validates the data derived from the representation for the first credential associated with the user. The server verifies the identification data associated with the validating device.

Based on validating the data derived from the representation for the first credential and verifying the identification data associated with the validating device, the server determines data associated with the user that is to be shared with the validating device. The data associated with the user that is to be shared with the validating device includes a first set of data that is available only when the identification data associated with the validating device is verified, and a second set of data that is available independent of verifying the identification data associated with the validating device. The server transmits to the validating device the data associated with the user that is to be shared with the validating device.

Particular implementations may include one or more of the following features. Determining, by the server, data associated with the user that is to be shared with the validating device may comprise the server accessing an instruction configured by a credential issuing organization that is operable to manage the first credential associated with the user. The instruction may direct the server to transmit the first set of data when the identification data associated with the validating device is verified and to transmit the second set of data when the identification data associated with the validating device is not verified. Based on accessing the instruction configured by the credential issuing organization, the server may obtain the first set of data associated with the user when the identifying associated with the validating device is verified and obtain the second set of data associated with the user when the identification data associated with the validating device is not verified.

The identification data associated with the validating device may include a second credential that is associated with the validating device. Verifying the identification data associated with the validating device may comprise validating the second credential associated with the validating device.

The instructions may cause the one or more processors to perform the following operations. The server may receive from a second validating device, a second request to validate a second representation for the first credential associated with the user. The second request may include data derived from the second representation for the first credential and identification data associated with the second validating device. The server may validate the data derived from the second representation for the first credential. The server may examine the identification data associated with the second validating device. Based on validating the data derived from the second representation for the first credential and examining the identification data associated with the second validating device, the server may determine that the second validating device is not enabled to access the first set of data associated with the user. In response to determining that the second validating device is not enabled to access the first set of data associated with the user, the server may send to the second validating device the second set of data associated with the user.

Implementations of the above may include methods, systems and computer program products. A method may perform one or more of the above described actions. A system may comprise a non-volatile memory device that includes logic operable to perform one or more of the above described actions. A computer program product may be suitably embodied in a non-transitory machine-readable medium and include instructions executable by one or more processors. The instructions may be configured to cause the one or more processors to perform the above described actions.

The details of one or more implementations are set forth in the accompanying drawings and the description, below. Other features will be apparent from the description and drawings, and from the claims.

DESCRIPTION OF DRAWINGS

FIG. 1 shows a sample user interface that is configured to enable a user to select from among various credentials belonging to the user.

FIG. 2 illustrates a sample credential shown on a user interface along with an optical-machine readable representation for the credential.

FIG. 7 shows an example user interface for validating an alphanumeric code representing a credential.

FIG. 8 illustrates an example user interface that shows a validatee's information on a validating device following successful validation of the validatee's credential.

FIG. 9 illustrates another example user interface that shows a validatee's information on a validating device following successful validation of the validatee's credential.

FIG. 10 illustrates an example user interface that shows a validatee's private information on a validating device when the validator is enabled to access the validatee's private information.

DETAILED DESCRIPTION

Figure 4:
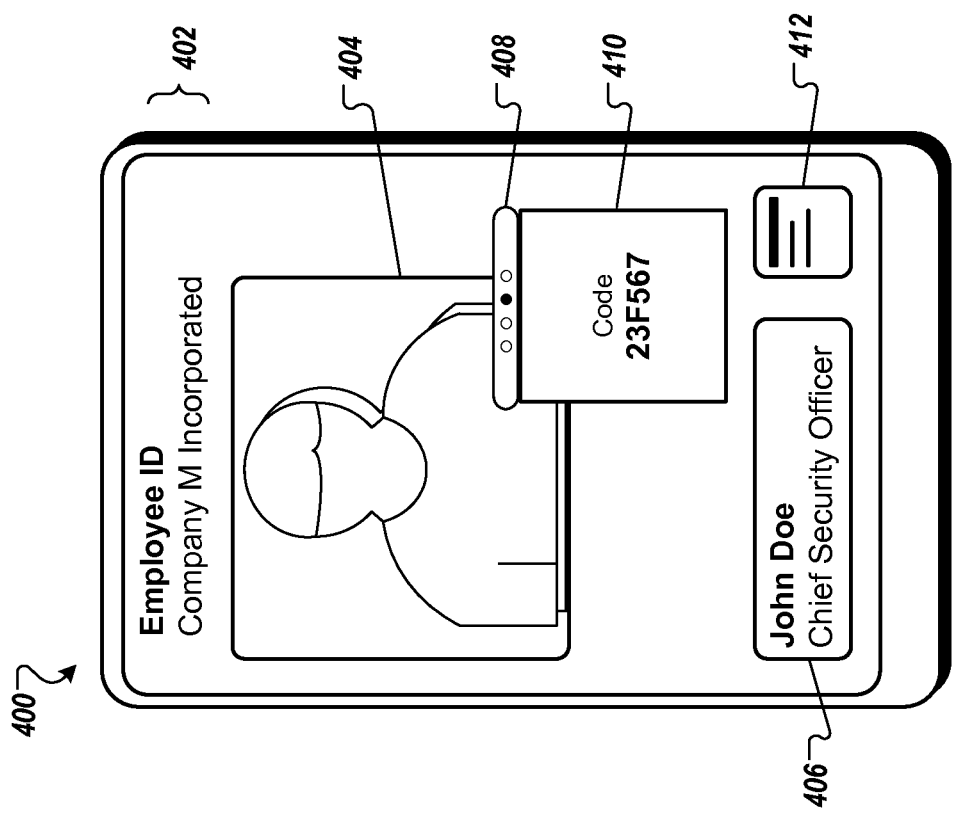
FIG. 4 illustrates a sample credential shown on a user interface along with an alphanumeric code representing the credential.

In some instances, representations of credentials for individuals, or for groups of individuals, or both, are generated. The credentials may be, for example, identity credentials (driver's licenses, passports, visas, police badges etc.), health insurance cards, loyalty cards, badges reflecting membership in a group (e.g., employees of a company, students of an educational institution, gym club memberships, etc.), badges to gain entrance to a location or event, a ticket for entry to a location or event, a key that unlocks a lock (e.g., for entry to a location), etc.

In some implementations, different credentials may be issued by different credential issuing organizations. For example, a company may be a credential issuing organization issuing credentials for its employees that are used for accessing various company resources, while a physical fitness chain may be another credential issuing organization that issues credentials to its members for accessing the gymnasiums managed by the chain.

The credentials issued by different credential issuing organizations may be managed using a credential management system, which enables a first user of the system to validate a credential presented by a second user of the system irrespective of the credential issuing organization that issued the credential. Responsive to successful validation of a credential, information associated with the validated credential (including information about the credentialed second user) may be disseminated to the validating first user. In the following description, a user who is validating a credential is also referred to as a "validator," while a user associated with the validated credential is also referred to as a "validatee."

There may be situations where data to be returned to a user or application responsive to successful validation of a credential is not to be shared with all users and/or applications that can validate the credential. To accommodate these situations, when issuing a credential to a user, a credential issuing organization may designate certain information associated with the credential as being "public," and, thus, safe to provide in response to a successful validation of the credential (e.g., by any user, or application, or both), whereas other information associated with the credential is designated as "private," and, thus, only to be shared with certain users and/or applications (e.g., users and/or applications holding certain credentials associated with the credential issuing organization) responsive to successful validation of the credential.

In other words, information associated with the validated credential (including information about the validatee) may have different sharing designations associated with different information. The sharing designations may be determined by the credential issuing organization, or the validatee, or any suitable combination of both. Depending on the sharing designation, different information may be disseminated to different validators. In some cases, some information corresponding to the validatee may be shared by default with all successful validators, while other information (e.g., more sensitive identifying information or permissions associated with accessing various resources) may be shared based on the identity of the validator (where the identity of the validator is based on credentials held by the validator, or an identifier associated with the validator, or both). For example, user information that is designated as "public" by the credential issuing organization may be transmitted to the validating device (e.g., to enable the validator to compare the copy of the credential to the credential presented by the validatee). If the credential is validated by a user associated with the same credential issuing organization as the validatee (e.g., a validator who holds a credential from the same credential issuing organization as the validatee) or an application associated with the validatee's credential issuing organization, additional information corresponding to the validated credential that is designated as "private" by the credential issuing organization may be transmitted to the validating user.

In some implementations, different additional information may be transmitted to different validators. For example, a validator that is associated with the credential issuing organization of the credential being validated may receive a first subset of the "private" information associated with the validated credential. On the other hand, a different validator associated with a different credential issuing organization may receive a second subset of the "private" information associated with the validated credential that is different from the first subset. For example, the credential issuing organization may be a company, with the credential being an employee badge or identification. In this case, the first subset may include information such as the duration of employment of the associated employee, name and contact information for the employee's supervisor, or some other suitable information. The validator may be a customer of the employee's company, with the second subset of information including the employee's work email address and work phone, but excluding the employment duration, or supervisor information, mentioned above.

Credentials can be maintained on and/or accessed from electronic client devices (e.g., mobile computing devices like smart phones and tablet computers), which are also referred to simply as client devices. Instances of an application associated with the credential management system may run on the client devices for managing credentials stored therein. A server, or collection of servers, also may be associated with the credential management system for centralized management of credentials issued by various credential issuing organizations and for distributing credentials to appropriate users' client devices. Users and third-parties may operate the client devices to present representations of the credentials for validation, and the representations may be validated using suitable mechanisms.

Techniques for validating user credentials and regulating information corresponding to the validated credential that is disseminated to the validating devices are described in greater detail in the rest of this disclosure.

FIG. 1 shows a sample user interface 100 that is configured to enable a user to select from among various credentials belonging to the user. The user interface (UI) 100 may be shown on a display coupled to a client device corresponding to the user. The UI 100 may be associated with an instance of the credential management application that is executed on the client device. For example, the UI 100 may be a page of the user interface that is shown by the credential management application when executed on the user's client device.

As shown in FIG. 1, the UI 100 includes a caption 102 and one or more buttons 104 and 114. In addition, the UI 100 displays one or more credentials 106, 108 and 110.

The caption 102 "Wallet" identifies the UI 100 as the user's wallet, which is a collection of the various credentials associated with the user. In some implementations, the user's wallet is managed by the instance of the credential management application running on the user's client device.

The various credentials shown by the user's wallet may be issued by different credential issuing organizations, or by the same credential issuing organization, or by a combination of both. For example, the UI 100 displays a "Gym Membership ID" 106 issued by Workout Gym. In addition, the UI 100 displays an "Employee ID" 108, and a "Company M Headquarters 10th Floor Access Badge" 110, both of which are issued by Company M Incorporated.

The user can select any one of these credentials from the user's wallet to output a representation of the credential from the user's client device. In some implementations, the display coupled to the client device may be a presence-sensitive display (for example, a capacitive touch-sensitive display) and the user may make the selection by touching an area of the display that shows the selected credential.

The user can select an Edit command button 104 to modify settings associated with the credentials, and can add a credential that has been issued to the user by a credential issuing organization to the wallet by selecting the command button 114.

Examples of different representations for credentials and mechanisms for validating the different representations are described with reference to FIGS. 2-7. In certain implementations, credentials can be represented by alphanumeric codes, optical machine-readable representations, sound signals, and/or near-field communication (NFC) signals.

FIG. 2 illustrates a sample credential 200 shown on a user interface along with an optical-machine readable representation for the credential. The credential 200 may be presented, on a display coupled to client device of the user associated with the credential 200, by the UI created by an instance of the credential management application executed on the client device. For example, the credential 200 may be shown by the same UI that is associated with the UI 100. When a user selects the "Employee ID" 108 shown in UI 100, the selected credential (i.e., the employee ID) may be displayed on the client device as shown in FIG. 2.

The credential 200 includes captions 202 and 206; an image 204; a slider 208; a representation for the credential 210; and a control button 212.

The caption 202 provides information identifying the type of the credential and the credential issuing organization. For example, the caption 202 identifies the credential 200 as an "Employee ID" for "Company M Incorporated."

The image 204 is an image of the user associated with the credential 200. In some implementations, the image 204 allows a validator to visually identify the employee associated with the credential 200. In some implementations, the client device may obtain the user's image from, for example, a memory coupled to the client device, while in some other implementations, the client device may obtain the user's image from a remote server, such as a server managed by the credential management system.

The caption 206 provides the name, or other identifying information, or both for the user associated with the credential. For example, as shown, the caption 206 provides the name of the employee associated with the credential 200 as "John Doe" and the employee designation as "Chief Security Officer."

The slider 208 may enable a user to select between different representations for the credential 200 by swiping between different positions of the slider. A representation for a credential may be a depiction or rendering corresponding to the credential that enables the credential to be validated. For example, the slider 208 may include four positions indicated by the dots included in the slider 208, as shown in FIG. 2. In the first position of the slider, the slider 208 may cause an optical-machine readable representation for the credential 210 (e.g., a quick response (QR) code) to be displayed, as shown in FIG. 2 and discussed in greater detail below.

In some implementations, the control button 212 may indicate that additional information corresponding to the user associated with the credential 200 is available. When the user selects the control button 212 (for example, by touching an area of the presence-sensitive display that shows the control button 212), a new page may be shown by the UI that provides further information regarding the user, such as the employee's phone number, the employee's electronic mail (email) address, or other suitable information.

As referred to herein, an optical machine-readable representation of a credential may be an arrangement of graphical elements that encode alphanumeric data representing the credential, where the elements are arranged so that the data can be read by an optical scanner. For example, an optical machine-readable representation of a credential may be a bar code, a QR code, or an Aztec code, among other optical machine-readable representations. In some instances, a given optical machine-readable representation of a credential only may be valid for a certain time period. In some implementations, optical machine-readable representations of credentials may encode data including or representing credential identifiers and any other suitable data. In other implementations, optical machine-readable representations of credentials may encode other identifiers that are linked to, or otherwise associated with, credential identifiers.

To generate an optical machine-readable representation, the user's client device may use any suitable technique for encoding alphanumeric data within the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

To initiate the validation process for an optical machine-readable representation, the user's client device may output an optical machine-readable representation to a display coupled to the client device, as shown in FIG. 2 by the credential representation 210. Subsequently, a validating device can scan the portion of the client device's display showing the credential representation 210 and process the scanned credential representation to validate the credential 200.

Figure 3:
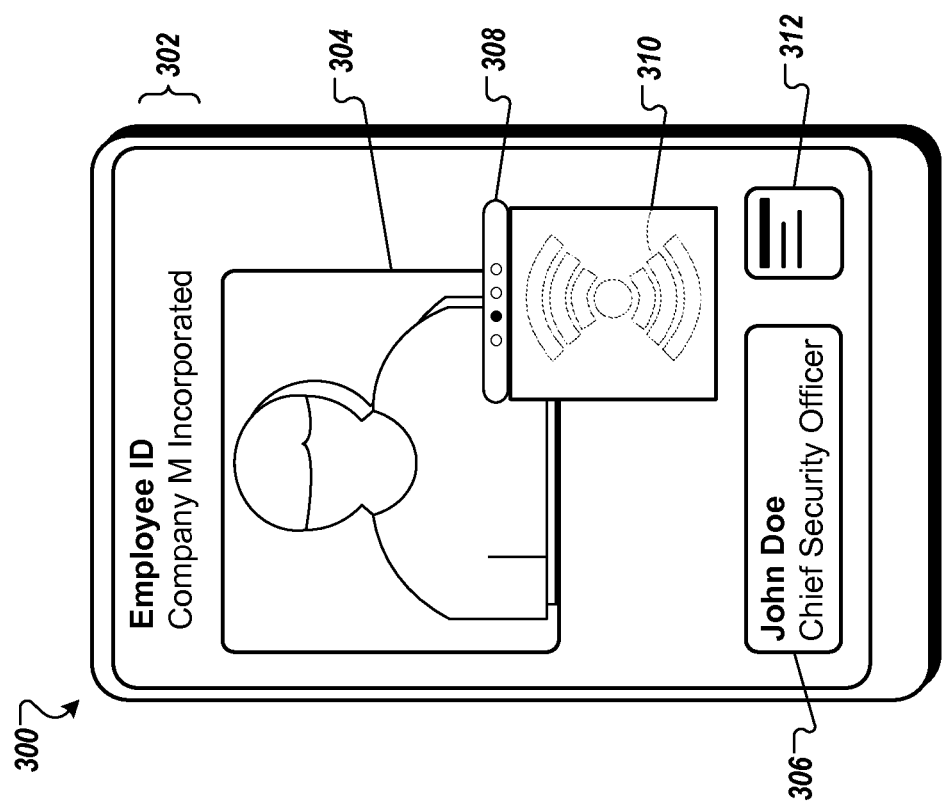
FIG. 3 illustrates a sample credential shown on a user interface while a signal representing the credential is being transmitted.

FIG. 3 illustrates a sample credential 300 shown on a user interface while a signal representing the credential is being transmitted. The credential 300 may be presented on a display coupled to an electronic client device of the user associated with the credential. The credential 300 may be shown by the UI corresponding to an instance of the credential management application executed on the client device.

The credential 300 includes captions 302 and 306; an image 304; a slider 308; a representation for the credential 310; and a control button 312.

The caption 302, in a manner similar to the caption 202, provides information identifying the type of the credential and the credential issuing organization. For example, the caption 302 identifies the credential 300 as an "Employee ID" for "Company M Incorporated."

The image 304 is an image of the user associated with the credential 300, in a manner similar to the associated between the credential 200 and the image 204. The caption 306 provides the name, or other identifying information, or both for the user associated with the credential. For example, as shown, the caption 306 provides the name of the employee associated with the credential 300 as "John Doe" and the employee designation as "Chief Security Officer."

The control button 312 provides functionality similar to the control button 212. For example, the control button 312 indicates that additional information corresponding to the user associated with the credential 300 is available, which is viewable upon selection of the control button 312 by a user.

The slider 308, which is similar to the slider 208, enables a user to select between different representations for the credential 300. The client device may be configured to enable the user to select from among different representations for the credential by inputting a gesture, e.g., by swiping the slider 308 between different positions of the slider, which are indicated by the dots displayed in the slider 308.

The first position of the slider 308 may cause the client device to display an optical machine-readable representation of the credential (e.g., a quick response (QR) code or bar code), as described with respect to the credential representation 210 illustrated in FIG. 2. The second position of the slider 308 may cause the credential management application to display the graphical representation 310, as shown in FIG. 3. In addition, the credential management application may output a signal, such as a sound signal from a speaker of the client device, or a near-field communication (NFC) signal from a wireless transmitter coupled to the client device. The outputted signal encodes a code (e.g., an alphanumeric code) representing the credential 300. As referred to herein, an alphanumeric code may be a sequence of numbers and/or letters (e.g., 4 to 24 characters) that is associated with a credential and a user.

The credential representation 310 provides a graphical indication that a signal (for example, a sound signal or an NFC signal) representing the credential 300 is being outputted.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

A sound signal representing a credential may encode data including, or representing, a corresponding credential identifier and any other suitable data. In addition, a sound signal representing a credential may encode another identifier that is linked to or otherwise associated with a corresponding credential identifier. In some implementations, a given sound signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

To generate a sound signal, a client device may use any suitable technique for encoding a representation of a credential. For example, the client device may call a function or library routine that encodes data into sound signals such as the Zoosh software development kit (SDK) by Naratte, Inc. The validatee's client device can then output the sound signal representation of the credential from a speaker coupled to the client device for reception by a validating device.

An NFC signal, as described herein, may correspond to a set of standards (e.g., ECMA-340 and ISO/IEC 18092) for client devices to establish radio communication with each other by touching them together or bringing them into close proximity (e.g., typically no more than a few centimeters). NFC as described herein may also include other suitable short range wireless communication protocols such as Bluetooth or ZigBee.

A client device may use any suitable technique for encoding a representation of a credential within an NFC signal, such as a function or library routine. A NFC signal representing a credential may encode data including or representing a corresponding credential identifier and any other suitable data. In addition, a NFC signal representing a credential may encode another identifier that is linked to or otherwise associated with a corresponding credential identifier. In some implementations, a given NFC signal representing a credential may only be valid for a certain time period. For example, part of the data encoded in the signal may correspond to a time stamp, and the credential represented by the signal may be deemed invalid if a validating device attempts to decode the data more than a predetermined amount of time after the time stamp was generated.

As described in greater detail below with reference to FIG. 6, a validating client device may receive and decode the signal, for example by receiving the sound signal using a microphone of the validating client device, or by receiving the NFC signal using a wireless receiver coupled to the validating client device.

FIG. 4 illustrates a sample credential 400 shown on a user interface along with an alphanumeric code representing the credential. The credential 400 may be similar to the credential 200 or the credential 300, and is presented on a display coupled to an electronic client device of the user associated with the credential. The credential 400 may be shown by the UI corresponding to an instance of the credential management application executed on the client device.

The credential 400 includes captions 402 and 406; an image 404; a slider 408; a representation for the credential 410; and a control button 412.

The caption 402 is similar to the caption 202 or 302, while the caption 406 is similar to the caption 206 or 306; the image 404 is similar to the image 204 or 304; and the control button 412 is similar to the control button 212 or 312.

The slider 408 is similar to the slider 208 or 308, and enables a user to select different representations for the credential 400. For example, the client device may be configured to enable the user to select from among different representations for the credential by inputting a gesture, e.g., by swiping the slider 408 between different positions of the slider, which are indicated by the dots displayed in the slider 408.

As shown in FIG. 4, when the user selects the third position of the slider 408, the credential management application may display the credential representation 410, which is an alphanumeric code (e.g., "23F567"). A validating entity may enter this code into the validating client device and submit the code for validation.

As described previously, the alphanumeric code may be a sequence of numbers and/or letters (e.g., 4 to 24 characters) that is associated with a credential and a user. In some instances, a given alphanumeric code may be time-varying (e.g., will only be valid for a certain time period). To initialize an alphanumeric code, a server associates a given alphanumeric code with a credential, and distributes the alphanumeric code to the appropriate client device or devices. In such implementations, the alphanumeric code may be temporarily linked with the particular credential identifier on the server. Subsequently, the server may validate the credential by identifying which particular credential (if any) the alphanumeric code is linked to, and confirming that the identified credential is valid.

Figure 5:
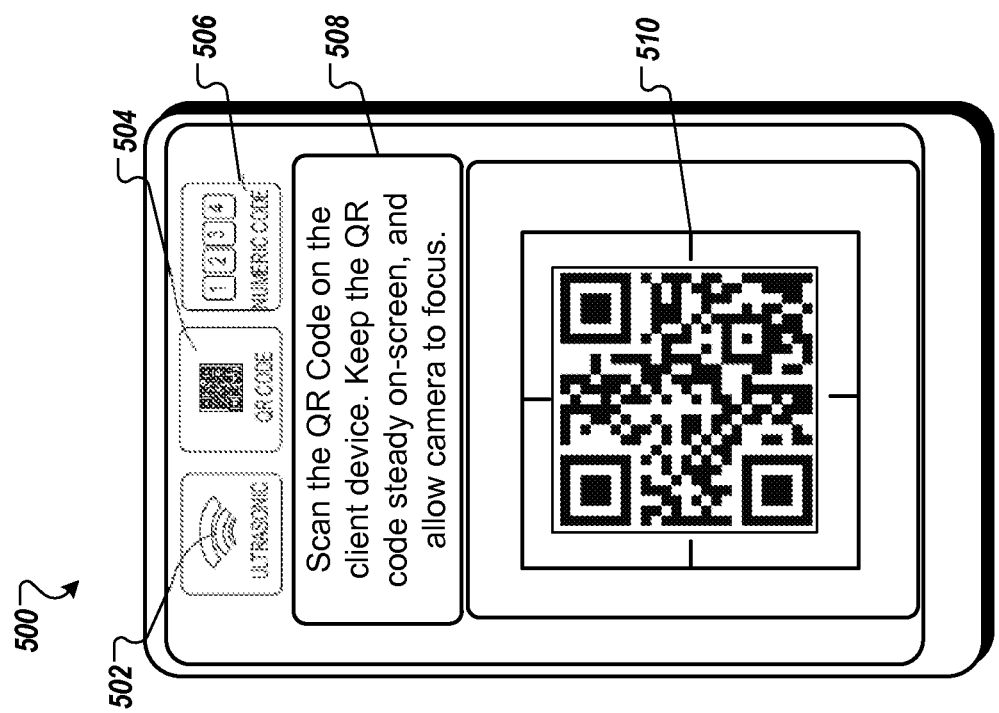
FIG. 5 shows an example user interface for validating an optical machine-readable representation for a credential.

FIG. 5 shows an example user interface 500 for validating an optical machine-readable representation for a credential. The UI 500 may be presented on a display coupled to a validating device by an instance of the credential management application executed on the validating device.

The UI 500 includes components, such as command buttons 502, 504 and 506; a caption 508; and a graphical indicator 510. As shown in FIG. 5, these components allow the validator to use the associated electronic device to validate an optical machine-readable representation for a validatee's credential, such as the credential 200.

The command buttons 502, 504 and 506 enable the validator to select from among different validation modes to validate different representations for credentials. The validator may select a command button by inputting a gesture, for example, by touching an area of the display that shows the selected button, in the case where the display is a presence-sensitive display.

Selection of a command button results in display of an associated caption and an associated graphical indication in the UI. The caption 508 and the graphical indicator 510 shown by the UI 500 are based on the validator selecting the command button 504.

In the example shown, the caption 508 instructs the validator to "Scan the QR code on the client device. Keep the QR code steady on-screen, and allow the camera to focus." In an example operation, the validator orients a camera on his or her client device such that an optical machine-readable representation for a credential (e.g., a bar code or a QR code) displayed on a validatee's client device is within an area of the graphical indicator 510 displayed on the validating device. In such a case, the graphical indicator 510 may be a reticle, as shown in FIG. 5. The reticle may indicate a field of view from a camera operatively coupled to the validating device. This reticle can be used to scan the optical machine-readable representation of the credential from the relevant portion of the validatee's client device's display.

The validating device may use any suitable mechanism to scan and decode the optical machine-readable representation of the credential. For example, the validating device may access a function or library routine that captures and decodes QR codes and/or barcodes using the camera operatively coupled to the validating device. Suitable libraries may include, for example, RedLaser or Zxing.

The validating device scans the QR code from the validatee's client device and inputs the scanned information into its associated memory. Then the credential management application running on the validating device processes the QR code. For example, the credential management application decodes the QR code (e.g., to obtain a set of alphanumeric characters) and attempts to validate the credential. In some implementations, the credential management application validates the credential by communicating the set of alphanumeric characters as part of a validation request to a remote validation server over a network connection.

When the server receives the validation request message, it attempts to confirm that the presented representation of the credential is valid. For example, the server may parse the alphanumeric code to obtain a credential identifier. The server can then access the corresponding credential using the credential identifier (e.g., from a database by querying using the credential identifier). Upon retrieving the credential, the server can determine whether the presented representation for the credential was valid by comparing data received in the validation request message (e.g., the alphanumeric code) with data associated with the retrieved credential.

Upon successful validation, the server transmits to the validating device a response indicating that the representation for the credential was valid (e.g., the presented alphanumeric code matches a valid alphanumeric code for the credential). In addition, the server may send information regarding the credentialed user. For example, the server may send some default "public" information that identifies the validated user. In some implementations, the server may send this public information without verifying information corresponding to the validating device, such as the identity of the validator associated with the validating device.

In some implementations, in addition to validating the credential, the server checks information associated with the validating device. For example, the validation request also may include the validator's credential information (or some other indication of the validator's identity), which is examined and verified by the server. The server validates the validator's credential (or otherwise confirms the validator's identity), and determines which information regarding the validated credential can be shared with the validating device, and by extension, with the validator.

In some implementations, the server looks up instructions that specify which information corresponding to the validated credential may be shared with the validating device, depending on the identity of the validating user. The instructions may be configured by the credential management system, or by the credential issuing organization associated with the validatee, or by the validatee itself, or by a suitable combination of one or more thereof.

Upon determining the information that may be shared based on the identification data associated with the validating device, the server sends the information to the validating device. For example, the instructions may specify that a subset of information associated with the validated user that is marked "private" may be disseminated to the particular validating user/device. Accordingly, the server may send the subset of the information to the validating device.

In some implementations, the credential management application validates the credential offline, e.g., using locally-stored databases of user credentials. For example, the optical machine-readable representation for the credential may include a certificate associated with the client device of the user or third-party presenting the optical machine-readable representation for validation. Alternatively or in addition, the representation for the credential may be associated with a certificate that is already stored locally at the validating device. The validating device may then compare information decoded from the optical machine-readable representation with information from the certificate to determine that the optical machine-readable representation is valid.

Figure 6:
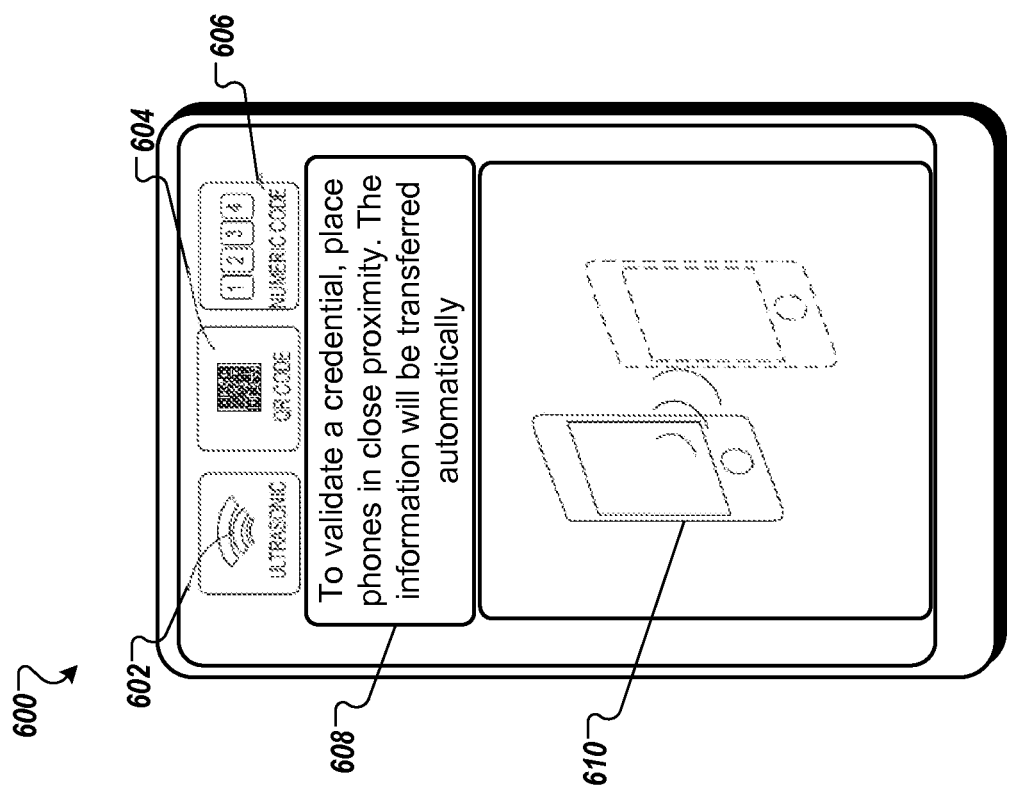
FIG. 6 shows an example user interface for validating a signal representing a credential.

FIG. 6 shows an example user interface 600 for validating a signal representing a credential. The UI 600 may be presented on a display coupled to a validator's electronic device, which enables the validator to validate another user's credential. The UI 600 may be shown by an instance of the credential management application executed on the validating device.

The UI 600 includes components, such as command buttons 602, 604 and 606; a caption 608; and a graphical indicator 610. As shown in FIG. 6, these components allow the validator to use the associated electronic device to validate a credential, such as the credential 200, which is represented by a signal, such as a sound signal or a NFC signal.

The command buttons 602, 604 and 606, which are similar to the command buttons 502, 504 and 506, enable the validator to select from among different validation modes to validate different representations for credentials. The caption 608 and the graphical indicator 610 shown by the UI 600 are based on the validator selecting the command button 602.

In some implementations, selection of the command button 602 causes the UI 600 to display the caption 608 and an image as the graphical indicator 610, indicating that the validating device is ready to receive, or is receiving, the sound signal. As shown, the caption 608 instructs the user as follows: "To validate a credential, place phones in close proximity. The information will be transferred automatically." In an example operation, the validator places a microphone coupled to the validating device such that a sound signal being output by a speaker of the validatee's client device can be received, e.g., by a microphone of the validator's client device.

The sound signal encodes a representation (e.g., an alphanumeric code) of the validatee's credential, which is received by the validating device. Then the credential management application running on the validating device processes the received signal. For example, the credential management application decodes the code encoded within the sound signal to obtain a set of alphanumeric characters and attempts to validate the credential. In some implementations, the credential management application validates the credential by communicating the set of alphanumeric characters as part of a validation request to a remote validation server over a network connection.

When the server receives the validation request message, the server confirms whether the presented representation of the credential is valid, in a manner similar to that described previously with respect to the alphanumeric representation of a credential. Upon successful validation, the server sends the validating device a validation response indicating that the representation for the credential was valid, and specific information regarding the validated credential, as discussed previously with respect to validating an optical machine-readable representation for a credential.

In some implementations, a validating device may validate a set of alphanumeric characters from a sound signal locally without requiring interaction with a server. For example, the sound signal may be encoded with a certificate associated with the client device of the user presenting the sound signal for validation. Alternatively or in addition, the representation for the credential may be associated with a certificate that is already stored locally at the validating device. The validating device may then compare information decoded from the sound signal with information from the certificate to determine that the sound signal is valid.

In another example operation, the credential representation may be an NFC signal. The validating device may receive the NFC signal at a receiver of the validating device and decode the NFC signal representing the credential to generate the set of alphanumeric characters encoded in the signal.

In some implementations, the validating device may then validate the NFC signal by transmitting a validation request message to a server. The validation request message may include data corresponding to the alphanumeric characters that were encoded in the NFC signal. When the server receives the validation request message, the server confirms whether the presented representation of the credential is valid, in a manner similar to that described previously with respect to the alphanumeric representation of a credential.

Upon successful validation, the server sends the validating device a validation response indicating that the representation for the credential was valid, and specific information regarding the validated credential, as discussed previously with respect to validating an optical machine-readable representation for a credential.

In some implementations, a validating device may validate a set of alphanumeric characters from an NFC signal locally without requiring interaction with a server. For example, the NFC signal may include a certificate associated with the client device of the user presenting the NFC signal for validation. Alternatively or in addition, the representation for the credential may be associated with a certificate that is already stored locally at the validating device. The validating device may then compare information decoded from the NFC signal with information from the certificate to determine that the NFC signal is valid.

FIG. 7 shows an example user interface 700 for validating an alphanumeric code representing a credential. The UI 700 may be presented on a display coupled to a validator's electronic device, which enables the validator to validate another user's credential. The UI 700 may be shown by an instance of the credential management application executed on the validating device.

The UI 700 includes components such as command buttons 702, 704 and 706; a caption 708; an input field 710; an input mechanism 712; and a submit button 714. These components allow the validator to use the associated electronic device to validate a credential, such as the credential 200, which is represented by an alphanumeric code.

The command buttons 702, 704 and 706, which are similar to the command buttons 502, 504 and 506 or the command buttons 602, 604 and 606, respectively, enable the validator to select from among different validation modes to validate different representations for credentials. The caption 708, the input field 710, the input mechanism 712 and the submit button 714 shown by the UI 700 are based on the validator selecting the command button 706. In some implementations, the input mechanism 712 is an alphanumeric keypad. The alphanumeric digits selected using the input mechanism 712 are shown on the input field 710. The submit button 714 causes the alphanumeric code entered using the input mechanism 712, and shown on the input field 710, to be submitted for validation In an example operation, the validatee provides an alphanumeric code representing his or her credential to the validator. For example, the validator may access the validatee's employee ID credential 400 on the validatee's client device, where the employee ID includes the alphanumeric code. The validatee may provide this code to the validator by speaking the code (e.g., over the telephone or in-person), showing the screen of the third-party's client device to the user, or sending a short message service (SMS) message to the user with the code. The validator then inputs the code using input mechanism 712. The code is displayed in the input field 710 as the validator enters the code. The validator then presses the submit button 714.

In some implementations, following the validator submitting the alphanumeric code by pressing the submit button 714, the credential management application running on the validating device obtains the set of alphanumeric characters and attempts to validate the credential, in a manner similar to that described previously with respect to the UI 500 or the UI 600. In other implementations, the alphanumeric code may be a randomly assigned code this is temporarily linked with the particular credential identifier on the server. In such implementations, the server may validate the credential by identifying which particular credential the alphanumeric code is linked to and confirming that the identified credential is valid.

FIG. 8 illustrates an example user interface 800 that shows a validatee's information on a validating device following successful validation of the validatee's credential. The UI 800 may be presented by an instance of the credential management application executed on the validating device on a display coupled to validating device. The UI 800 may be shown after the validator has successfully validated the user's credential, for example, using one of the mechanisms described with respect to the UIs 500, 600 or 700.

The UI 800 includes a title 802; an image 804; and a caption 806. The title 802 provides information identifying the type of the validated credential and the credential issuing organization. For example, the title 802 identifies the validated credential 800 as an "Employee ID" for "Company M Incorporated."

The image 804 corresponds to an image of the validatee, which allows the validator to visually identify the user associated with the validated credential. In some implementations, the validating device may obtain the image 804 from a remote validation server, while in some other implementations, the image 804 may be obtained from the databases that are locally stored in memory coupled to the validating device.

The caption 806 provides some identifying information regarding the validatee. For example, as shown, the caption 806 provides the name of the user associated with the validated "Employee ID" credential as "John Doe" and the employee designation as "Chief Security Officer."

As shown in FIG. 8, the UI 800 provides limited information regarding the validated user. In some implementations, the limited information that is shown by the UI 800 may be default or "public" information associated with the validated user. The public information is provided to any validating device upon successful validation of the user's credential, when the validating device does not have permission to access more detailed information regarding the validatee. This may be the case, for example, when the validator is not known a priori to the validatee such that a trust relationship does not exist between the validatee and the validator. In some other implementations, this may be the case when the credential issuing organization associated with the validatee's credential is different from the credential issuing organizations associated with the credentials held by the validator, and the credential issuing organization associated with the validatee's credential does not have an agreement for sharing detailed information regarding its credentialed users with the credential issuing organization associated with the credentials held by the validator. In yet other implementations, this may be the case when the validator does not have a suitable credential that may be used to establish its identity.

As described previously, in some implementations, the public information corresponding to the validatee is provided to the validating device by the validation server that received the validation request from the validating device for verifying the validatee's credential responsive to successful validation of the validatee's credential. The validation request includes information identifying the validating device or the validator. In addition to verifying the validatee's credential, the validation server verifies the identifying information corresponding to validator (or the validating device, or both). The identifying information may include the validator's own credential, or some other suitable information.

By verifying the validatee's credential and the validator's identifying information, the validation server may determine whether some relationship exists between the validatee and the validator. For example, the validation server determines whether the two users hold credentials issued by the same credential issuing organization.

Upon determining the relationship between the validatee and the validator, the validation server can select what information to send to the validating device responsive to successful validation of the validatee's credential. In some implementations, the validation server selects the information based on instructions configured by the validatee's credential issuing organization. For example, the validatee's credential issuing organization may stipulate that only the validatee's name, official designation and representative image may be sent to any validator's client device when the validator is not associated with the same credential issuing organization. This may be the case, for example, when the validator is associated with a different credential issuing organization, or the validation request does not include identifying information associated with the validator or the validating device.

Following the stipulation by the validatee's credential issuing organization, the validation server sends only the validatee's name, official designation and representative image to the validating device, as shown by the UI 800.

As described previously, in some implementations, the validation request may not include any identifying information corresponding to the validator or the validating device. Consequently, in such cases, the validation server does not attempt to verify the identifying information corresponding to the validator or the validating device. Instead, upon verifying the validatee's credential, the validation server simply sends the default public information associated with the validated credential, for example as stipulated by the example instructions above.

FIG. 9 illustrates another example user interface 900 that shows a validatee's information on a validating device following successful validation of the validatee's credential. The UI 900 may be presented on a display coupled to validating device by an instance of the credential management application executed on the validating device. The UI 900 may be shown after the validator has successfully validated the user's credential (for example, using one of the mechanisms described with respect to the UIs 500, 600 or 700) and when the validator is allowed to access more detailed information corresponding to the validatee.

The UI 900 includes a title 902; an image 904; a caption 906; and a control button 908. The UI 900 is largely similar to the UI 800 and provides the same default or public information associated with the validatee. The title 902, the image 904 and the caption 906 are similar to the title 802, the image 804 and the caption 806 respectively.

However, as an additional feature that is different from the UI 800, the control button 908 included in the UI 900 enables the validator to access more detailed information about the validatee upon selecting the control button 908. The additional information is provided to the validating device following successful validation of the user's credential, when the validating device (or the validator, or both) has the requisite permission to access more detailed information regarding the validatee. This may be the case, for example, when the validatee has configured the validated credential to share the validatee's private information with the particular validator, who may be known to the validatee beforehand and is trusted by the validatee. In some implementations, this may be the case when the credential issuing organization associated with the validatee's credential is the same as a credential issuing organization that has issued a credential to the validator. In yet other implementations, this may be the case when the credential issuing organization associated with the validatee's credential and a different credential issuing organization that has issued a credential to the validator have an agreement for sharing detailed information regarding each other's credentialed users, for example, the two credential issuing organizations may be the employers of the respective entities and they may share a business relationship.

In some implementations the validation server provides the private information corresponding to the validatee only after verifying the validator's credential, or other appropriate identifying information corresponding to the validator, which is included as part of the validation request. In such implementations, if the validation request does not include suitable identifying information corresponding to the validator, or if the validator's identifying information cannot be successfully verified, then the private information corresponding to the validatee is not sent to the validator upon successful validation of the validatee's credential. Instead, the validation server may send the validatee's public information, as described previously.

On the other hand, upon successfully verifying the validatee's credential and the validator's identifying information, in some implementations, the validation server may determine whether some relationship exists between the validatee and the validator. For example, the validation server may determine whether the two users hold credentials issued by the same credential issuing organization, or whether the credential issuing organizations associated with credentials held by the two users, even if different, have an established agreement for sharing their users' private credential information. Following an affirmative determination, the validation server may send to the validating device some default private information corresponding to the validatee. The default private information may be based on information that is configured for sharing, for example, by the validatee's credential issuing organization.

In some implementations, upon successfully verifying the validatee's credential and the validator's identifying information, the validation server looks up instructions configured by the validatee's credential issuing organization to determine whether private information corresponding to the validatee may be shared with the validator.

In some implementations, the private information that is shared may differ depending on the validator. For example, the validatee's credential issuing organization may stipulate that a first subset of the validatee's private information may be sent to any validator's client device when the validator hold a credential associated with the same credential issuing organization, while a second subset of the validatee's private information may be sent to any validator's client device when the validator holds a credential associated with another credential issuing organization with whom the validatee's credential issuing organization has an agreement for sharing information. The first and the second subsets may include different information corresponding to the validatee. While only two subsets of information are described for exemplary purposes, any suitable number of subsets and the associated stipulations may be implemented.

For example, the validated credential may be an employee ID issued by the validatee's employer, while the validator may be an employee of a different organization that is collaborating with the validatee's employer. In this case, the first subset of the private information may include, among other suitable information, the validatee's contact information, such as email address, office location and work phone; name of the validatee's supervisor; and permissions accorded to the validatee for accessing various resources provided by the validatee's employer. The first subset of information may be shared with a colleague of the validatee who is employed by the same employer (e.g., the colleague holds an employee badge issued by the same employer). On the other hand, the second subset may include, among other suitable information, the validatee's contact information, such as email address, office location and work phone; and permissions accorded to the validatee for accessing various resources provided by the validator's employer. The second subset of information may be disseminated to a validator who is employed by the other organization.

Based on the stipulation by the validatee's credential issuing organization on whether private information may be shared, or what subset of the private information may be disseminated to the particular validator, or both, the validation server sends the determined private information to the validating device. The availability of the private information is indicated by the control button 908 shown by the UI 900.

FIG. 10 illustrates an example user interface 1000 that shows a validatee's private information on a validating device when the validator is enabled to access the validatee's private information. The UI 1000 may be presented, on a display coupled to validating device, by an instance of the credential management application executed on the validating device.

The UI 1000 is shown after the validator has successfully validated the user's credential and successfully verified its own identity, and when the validator is allowed to access the private information corresponding to the validatee that is shown by UI 1000. Accordingly, the UI 900 is displayed on the validating device, along with the control button 908 indicating that additional information corresponding to the validatee is available. When the validator selects the control button 908 (for example, by touching an area of the display that shows the control button, when the display is presence-sensitive), the UI 900 may transition to the UI 1000 on the display. As discussed in the preceding section, the UI 1000 may exhibit a subset of the private information associated with the validatee.

The UI 1000 includes a title 1002; a control button 1004; and private information 1006 associated with the validatee, which includes, as shown, the validatee's employment duration 1008, email address 1010, office location 1012, work phone 1014 and information 1016 regarding permission to access Wireless Fidelity (Wi-Fi) resources.

The title 1002 provides information identifying the user associated with the validated credential and the credential issuing organization. For example, the title 1002 identifies the user "John Doe," with the associated credential being issued by "Company M." In the example shown, the credential is an employee ID that is issued to "John Doe," who is an employee of "Company M."

Selection of the control button 1004 enables the validator to return to the UI 900. For example, after examining the private information 1006 shown by the UI 1000, the validator may select the control button 1004 (for example, by touching an area of the display that shows the control button, when the display is presence-sensitive), and the UI 1000 transitions back to the UI 900 in response.

In the example shown, the control button 1004 includes a graphical checkmark. However, in other implementations, the control button 1004 may include different information. For example, in some implementations, the control button 1004 may include the text "Done".

As described previously, the private information 1006 returned to the validator may differ based on the identity of the validator and/or credentials held by the validator. Continuing with the above example, in some implementations, the private information 1006 as shown is provided to the validating device when the validator is also an employee of "Company M." However, if the validator is not an employee of "Company M" (such that the credential issuing organization associated with the validator is different from "Company M"), then the private information shown by the UI 1000 may be different. For example, the Wi-Fi access information 1016 may not be present.

Figure 11:
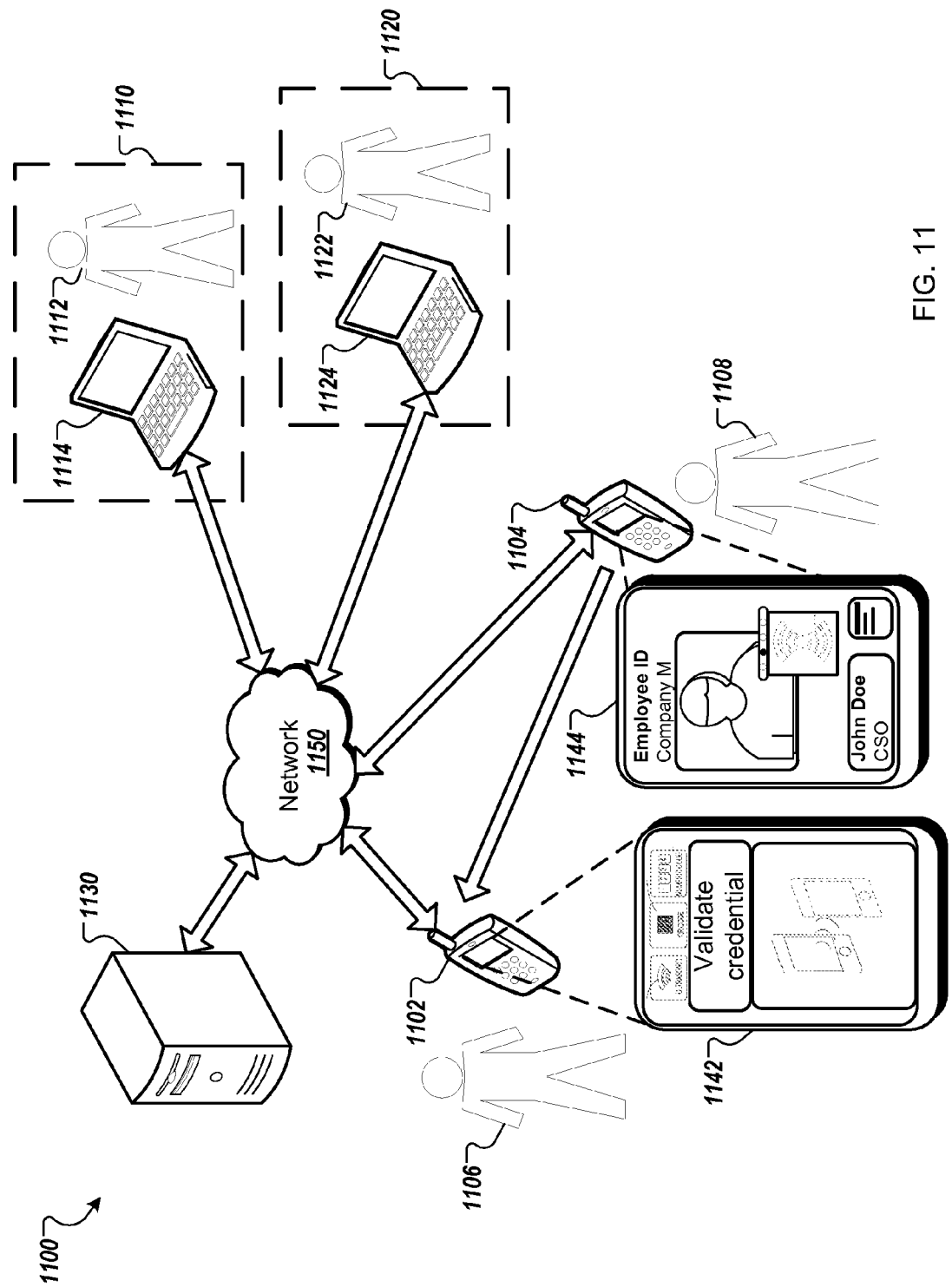
FIG. 11 shows an example system for the management, distribution, and validation of user credentials.

FIG. 11 shows an example system 1100 for the management, distribution, and validation of user credentials. The system 1100 may be a credential management system that is configured to manage the user credentials associated with the validatee, or the validator, or both, as discussed in the preceding sections.

The system 1100 includes client device devices 1102 and 1104 that are associated with users 1106 and 1108 respectively; a first credential issuing organization 1110 that includes an administrator 1112 and an associated processing system 1114; a second credential issuing organization 1120 that includes an administrator 1122 and an associated processing system 1124; a network 1150 and a server 1130. Communication between the client devices 1102 and 1104 is indicated by 1140. UIs 1142 and 1144 are displayed on the client devices 1102 and 1104 respectively, while UI 1146 is displayed on the processing system 1112. The UI 1146 includes a graphical indicator 1148.

The user 1106 may be a validator that attempts to validate a credential associated with the user 1108, who is the validatee. As illustrated in FIG. 11, when the validator 1106 attempts to access the validatee's credential, the user 1106 operates the client device 1102 (the validating device) to validate a credential presented by the validatee 1108. As part of validating the validatee's credential, the validating device 1102 presents a validation screen on the UI 1142 shown on the display coupled to the validating device 1102. A representation of the validatee's credential may be presented by the UI 1144 shown on the display coupled to the client device 1104.

The UIs 1142 and 1144 may be displayed and managed by instances of the credential management application that are running on the respective client devices. The instances of the credential management application are part of the credential management system 1100, or the credential issuing organization 1120, or both, and are configured to communicate with other entities in the system, such as with the server 1130 over the network 1150.

In some implementations, each of the users 1106 and 1108 and their respective devices 1102 and 1104 may be associated with a different credential issuing organization. For example, user 1106 may be issued a credential by credential issuing organization 1110, and the credential may be managed by the instance of the credential management application running on client device 1102. User 1108 may be issued a credential by credential issuing organization 1120, with the credential being managed by the instance of the credential management application running on client device 1104.

Once the validating device 1102 has successfully accessed the representation of the validatee's credential (for example, using signal transmission as indicated by the UIs 1142 and 1144), the credential management application running on the validating device 1102 may present the validatee's credential (or a representation of or an identifier for the validatee's credential) to the credential management system for validation. In one implementation, the validating device 1102 communicates the credential representation to the server 1130 in a validation request, along with its own identifying information.

In some implementations, the server 1130 is a validation server that is managed by the credential management system. The server 1130 validates the credential received from the validating device 1102 and also verifies the identity of the validator 1106 that is included in the validation request. Following successful verification of the validatee's credential and the validator's identity, the server determines what information corresponding to the validatee may be sent to the validating device 1102.

In some implementations, the server 1130 makes this determination based on instructions configured by the credential issuing organization 1110. In addition to communicating with client devices 1102 and 1104 over the network 1150, the server 1130 communicates via network 1150 with the credential issuing organization 1110. The credential issuing organization 1110 may include an administrator 1112, who manages the operations of the credential issuing organization using the processing system 1114.

Based on determining the information corresponding to the validatee that may be sent to the validating device 1102, the server 1130 sends a response to the validating device 1102 with the determined information. As discussed previously, the information that is shared may be the validatee's public information or private information, depending on the identity of the validator 1106 and/or the credentials held by the validator 1106 in view of the instructions configured by the credential issuing organization 1110. In some implementations, the extent of public or private information that is shared also varies based on the identity of the validator 1106.

In operation, the server 1130 manages and/or stores one or more credentials, associates users and groups of users with appropriate credentials, and provides the credentials to users' client devices and/or processing systems (e.g., operated by credential authorities) for validation. The server 1130 can be any suitable computer or collection of computers executing software capable of managing, distributing, and/or validating representations of credentials for users and groups of users via a network 1150 as described herein.

Credentials, user accounts, group accounts, and administrative accounts can be stored in a database (e.g., MySQL, PostgreSQL, MS SQL Server, MongoDB), or other suitable data structure that can be accessed by the server 1130. In some implementations, the server 1130 may access the stored credentials and/or user accounts via web services such as representational state transfer (REST) style services.

As an initial step, the server 1130 creates a credential based on input provided by a credential issuing organization (e.g., an employer). In some implementations, multiple different credential issuing organizations (e.g., different entities and/or organizations) may issue credentials using the same server 1130. The credential may include a variety of information such as a credential identifier (e.g., a number or alphanumeric character string that uniquely identifies a credential), an indication of the grantor of the credential, information about the user to whom the credential issuing organization granted the credential, an indication of one or more permissions granted by the credential issuing organization to the user, a description of an event or location associated with the credential, and/or third-party instructions (e.g., instructions governing what information associated with the user may be disseminated to third party users that request validation of the user's credential).

In some implementations, the instructions may include information identifying a type, classification, or rank of the validator's credential that can be enabled to access private information associated with the validated credential. For example, the private information associated with an employee badge for a company may be shared with the validator when the validator's credential is: (i) an employee badge of the same company; and/or (ii) a manager or supervisor badge associated with another employer that is a business partner of the validatee's company.

Alternatively or in addition, the instructions may include information identifying particular third-parties (e.g., names, credential identifiers, and/or user identifiers) who may access the validatee's private information. In some implementations, the instructions also may include a temporal condition that identifies one or more time periods during which the sharing of private information is enabled. For example, the private information associated with the validated credential may only be accessible during regular business hours. During other time periods, only the public information associated with the validated credential may be accessible.

In some implementations, the server 1130 may present a suitable interface to the credential issuing organization 1110 for creation of credentials. For example, the server 1130 may present a web interface through which the credential issuing organization can interact using a web browser. In other implementations, the server 1130 may be directly accessible via a graphical-user interface or an application running on a mobile device. Any suitable interface can be used that enables the creation and storage of credentials, and user accounts. In addition (or as an alternative) to creation of credentials by credential issuing organizations, credentials may be created at the request of registered users through a web-based or other interface, or through any other suitable mechanism such as sending email or short message service (SMS) transmissions to credential issuing organizations. In some implementations, registered users may be able to create credentials by use of an application running on a client device.

The interface for the creation of credentials may provide a credential issuing organization the ability to associate conditions with the credentials, such as instructions for sharing private information associated with the credentials, as discussed above. For example, the interface may show a hierarchical menu of potential third-parties who can access the private information associated with the credential, and allow the credential issuing organization to identify the desired third-parties. These potential third-parties may be identified, for example, by name and/or by a type of credential the third-party must possess to access the private information. For example, the potential third-parties may include particular individuals such as "John Doe," and/or particular credentials such as "Corporate Security Council Badge" or "Company M Employee Badge."

In some implementations, a credential issued by the credential-issuing organization 1110 may be represented as any suitable data object, such as an eXtensible Markup Language (XML) or JavaScript Object Notation (JSON) object. In such implementations, the "private" information associated with the credential may be identified within the JSON object. In some implementations, information that is not identified as private may be considered as public information. However, in other implementations, both the private and public information may be explicitly identified.

The following example shows a sample JSON object for a credential, which includes a badge for a user named "John Doe" associated with organization "Company M." The private information in the credential is indicated with the tag "private."

The credential may include different types of private information, which are shown as different attributes in the JSON object associated with the credential. For example, in the exemplary JSON object shown below, the private information includes information on the user's department within the company (indicated as an attribute named "group"), which is of "type" "string" with a value "Administration." The private information also includes the name of the user's supervisor (indicated as an attribute named "supervisor"), which is of "type" "string" with a value "Jane Smith." A validator who is enabled to access the above private information may determine that the user John Doe is in the Administration department in Company M, and the user's supervisor is Jane Smith.

The above may be considered as detailed personal information about the user associated with the credential that is private. The private information also may include user authentication/log-in information, which may be verified by third-party applications when the user attempts to access resources associated with the third-party applications. For example, the exemplary JSON object below includes the user's login name for accessing a particular resource (indicated as an attribute named "login_name"), which is of "type" "string" with a value "john.doe." As another example, the private information includes an access control identifier (shown as attribute "access_control_id") that is of type "number" and has a numerical value "1600341998." The user's login name and the access control identifier may correspond to different resources. For example, the login name may be used to access a web-based email account, while the access control id may be used to unlock a door for accessing a conference room at Company M's premises.

The other information included in the exemplary JSON object below, such as the user's name (e.g., "John Doe"), the user's title (e.g., "Chief Security Officer"), and the organization (e.g., "Company M") may be public information. The JSON object also may include other fields or attributes and their associated values, which are indicated in the example shown below by ellipsis (i.e., " . . . ").

```
{
  "badges":
  [
    {
      "badgeinfo":{
        "name": "John Doe",
        "title": "Chief Security Officer",
        "orgname": "Company M",
        "expiration":31234123, //UNIX timestamp
        "cache_until":1335195206, //UNIX timestamp
        "extra": "jdoe@companym.com",
        "photo": {
          "desc":...,
          "type":...,
          "value":... // or "reference"
        }
      },
      "badgeinfo_additional":[
        {
          "name":...,
          "desc":...,
          "type":...,
          "value":... // or "reference"
        },
        ...
      ],
      "private":[
        {
          "name": "group",
          "type": "string",
          "value": "Administration"
        },
        {
          "name": "supervisor",
          "type": "string",
          "value": "Jane Smith"
        },
        {
          "name": "login_name",
          "type": "string",
          "value": "john.doe"
        },
        {
          "name": "access_control_id",
          "type": "number",
          "value": "1600341998"
        },
      ],
      "meta": {
        "format": {
          ...
        }
      }
    },
    {
      ...
    }
  ]
}
```

The server 1130 also may present an interface so that users and/or credential issuing organizations can create user accounts for individual users and groups of users. For example, the server 1130 may present a web interface through which credential issuing organizations can interact via a Web browser. Additionally or alternatively, the server 1130 may be directly accessible via a graphical-user interface or an application on a mobile device. User accounts may be stored in a table or collection of tables in a database, or in any other suitable data structure accessible by the server 1130. The user accounts may include a variety of information such as user name, user title, user identifier (e.g., a number or character string that uniquely identifies a user), one or more unique keys for the user (e.g., alphanumeric codes that can be used for encryption and/or decryption), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

As an example, a Mr. John Smith may request a new user account from the server 1130 using an application executing on his client device. The server 1130 can then create database entries representing a user account for Mr. Smith. A credential issuing organization could then create a row in another table for a group identified as employees of Company X. The grantor and/or server 1130 could then link the database entry for Mr. Smith to the group account for Company X through use of a linking table.

Once credentials and users, or groups of users, have been created, credential issuing organizations and/or users can associate the credentials with users, or groups of users. For example, the server 1130 may present a web interface through which grantors can interact via a Web browser to link a given credential to a given user or group of users. In other aspects, the server 1130 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1130 also may notify the users that they have been associated with the credential(s), for example by pushing notifications to the respective users' client devices. Such notifications may include the credential identifier and/or a key for the user.

As described herein, a key may be any suitable alphanumeric code that is unique to a given user. For example, a key may be a symmetric key or shared secret between the client device and the server that can be used to maintain a private information link. In other implementations, the key may be a private key and/or public key that can be used with a public-key cryptographic system. The key may be of any suitable length such as, for example, 80 bits, 128 bits, or 256 bits. In some implementations, an application executing on the client device may have the key pre-installed, or may receive a key when a user first runs the application and creates a user account associated with the application, or may receive a key when a user logs into the application from the client device. In some implementations, the client device may receive the key from the server in a key exchange (e.g., a Diffie-Hellman key exchange).

Once credentials have been associated with appropriate user and/or group accounts, the credentials can then be distributed to client devices for the appropriate users via the network 1150. For example, the network 1150 may be a local area network ("LAN") and/or a wide area network ("WAN"), e.g., the Internet. In some versions, the server 1130 may communicate with the client devices via SMS or multimedia messaging service (MMS). The server 1130 may access user accounts in a database to locate the appropriate users' client devices.

Client devices 1102, 1104 can receive the credentials associated with their respective users 1106, 1108 and store them in any suitable memory for later retrieval. A given user 1106, 1108 may be associated with multiple different credentials. Furthermore, some or all of the credentials associated with a user 1106, 1108 may be accessible on a user's client device 1102, 1104. In particular, software applications executing on the client devices 1102 and 1104 can retrieve the credentials associated with users 1106 and 1108, respectively, so they can be used for generating and presenting a representation of the credential (e.g., to a validation entity for validation). The client devices 1102, 1104 may be any type of computing device, including but not limited to a mobile phone, smart phone, personal digital assistant (PDA), music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

In some implementations, the instructions for accessing private information associated with credentials are enforced locally at the client device 1102, without interaction with the server 1130. In such implementations, the credentials and any instructions associated with the credentials may be stored locally at the client device 1102. When the validator 1106 attempts to display a validated credential, the credential management application running on the validating device 1102 identifies any condition associated with the validated credential and determines whether the conditions have been satisfied (for example, the identity of validator 1106 has been verified and a determination made that the validator 1106 is enabled to access the private information associated with the validated credential) before allowing any private information associated with the for the credential to be displayed. If the conditions have not been satisfied, the credential management application may display on the validating device 1102 only the public information associated with the validated credential.

In the above implementations, the client device 1102 may validate the representation for the credential provided by the client device 1104 without requiring interaction with the server 1130. For example, the representation for the credential provided by the client device 1104 may include a certificate associated with the validatee 1108 (e.g., a public key infrastructure (PKI) certificate). The credential management application running on the client device 1102 may then decode the certificate from the representation of the credential and determine that the certificate associated with the validatee 1108 is valid (e.g., by accessing a PKI system) and that the credential represented by the representation satisfies the condition associated with the credential.

In other implementations, the server 1130 may be involved in validating the representation for the credential provided by the client device 1104. For example, the validating device 1102 may send the representation of the credential associated with the client device 1104 to the server 1130 over the network 1150 for validation. In such implementations, the server also may verify the identity of the validator and determine whether the public information, or the private information, or both, is sent to the validating device.

In addition to enabling identity validation and sharing of public or private information as described above, a credential issued to a user (such as user 1108) by a credential issuing organization (e.g., 1110) using the credential management system 1100 also may confer certain privileges to the user. For example, the credential may enable the user to access one or more physical or logical resources under the control of the credential issuing organization. In some implementations, presentation of a representation of the credential to a validating device at a physical resource (e.g., a locked door) may enable the user to unlock the door.

For example, while shown in FIG. 11 as a person, in some implementations the validator 1106 can be any agent capable of validating representations of credentials presented by users. In one implementation, the validator 1106 may be a software application executed on a processing device for managing a door unlocking system. The software application processes a representation for a credential received from a client device 1104, decodes the representation to generate an alphanumeric set of characters, transmits the alphanumeric set of characters to the server 1130, and receives a response from the server 1130 indicating whether the user 1108 associated with the client device 1104 is allowed to access the resource managed by the validator 1106. The software application could then control a door lock and/or an automated gate to permit user 1108 to enter.

In a manner similar to the above, various different techniques may be employed to enable the user 1108 to use a credential to gain access to a logical resource, including, for example, logging into a computer, an application, or a Wi-Fi network.

In scenarios like the above where a user's credential is used to gain access to a physical or logical resource, access to the physical or logical resource may be regulated by a third party application (e.g., an application controlled by the credential issuing organization). The third party application may rely on the credential management application to validate the user's credential and, responsive to successful validation, pass it certain data relevant to the validated credential. For example, if the resource is a locked door controlled by an access control system, the access control system may rely on receiving a unique identifier associated with the user in order to unlock the door for the user. Similarly, if the resource is a logical resource that is password protected, a third party application that regulates access to the logical resource may rely on receiving a unique user name and password for the user in order to be able to provide the user access to the logical resource. This data that the third party application relies on receiving from the credential management application may be considered "private" because it is related to access control systems and is not to be made widely available. Consequently, this data is not to be shared with all users and/or applications that validate the user's credential using the credential management application. Rather, it is only to be shared with certain users and/or applications that are associated with the credential issuing organization.

As discussed above, as part of validating a credential, the identity of the validating device also gets verified and a determination is made whether the validating device is authorized to receive the private information associated with the validatee (e.g., an access control identifier to unlock a door, or a login username and password to log in to a web-based email account). The private information associated with the validatee is sent to the validating device, or an associated third-party application, to enable the physical or logical access only upon an affirmative determination regarding the authorization of the validating device to receive this private information.

Figure 12:
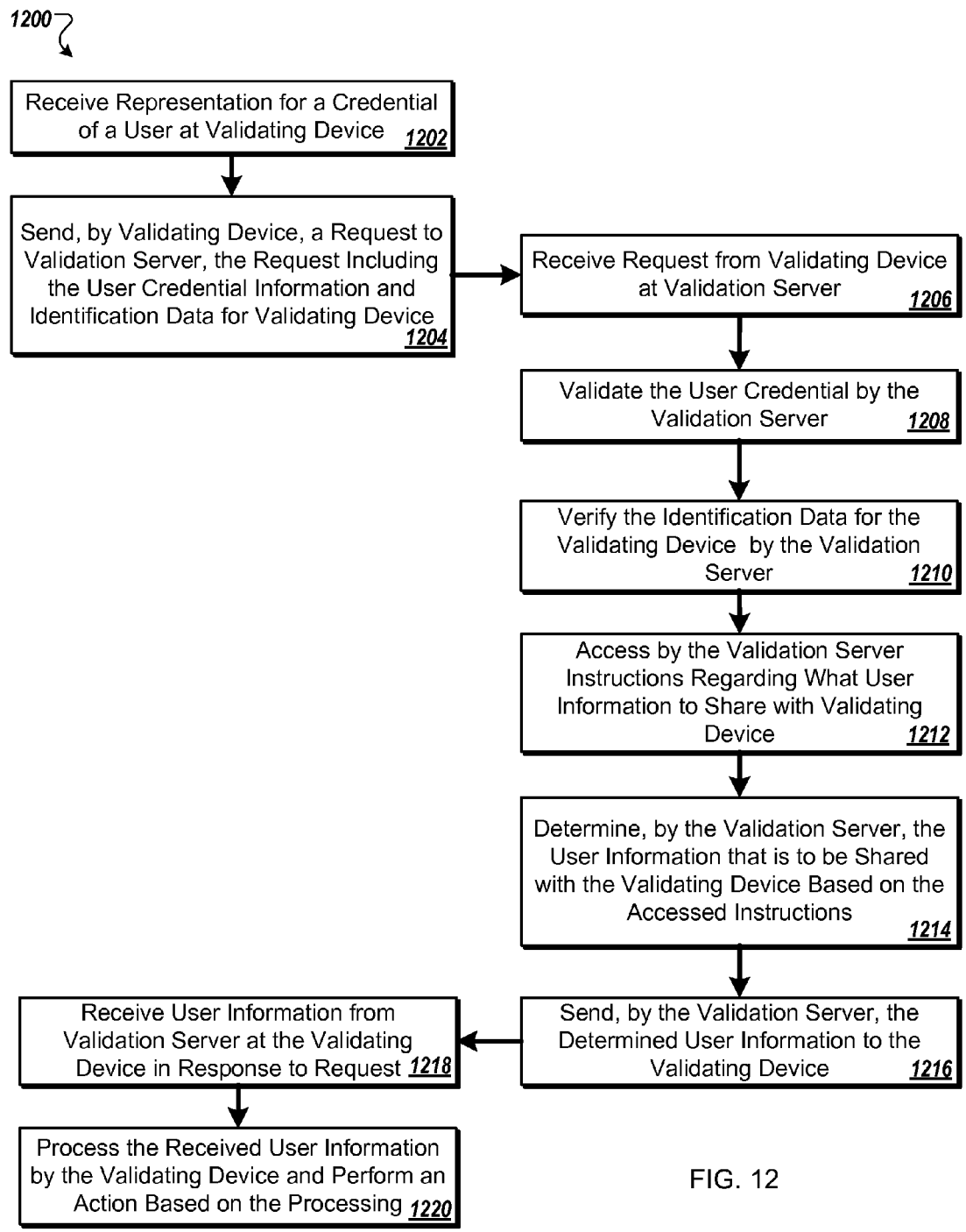
FIG. 12 is a flowchart of an example process for regulating dissemination of a user's credential information.

FIG. 12 is a flowchart of an example process 1200 for regulating dissemination of a user's credential information. The process 1200 may be performed, for example, by the client device 1102 in conjunction with the server 1130. Accordingly, the following description describes the process 1200 as performed by the components of the system 1100. However, in other implementations, the process 1200 also may be performed by other systems, including other client devices and servers.

At 1202, the validating device receives a representation for a credential of a user. For example, the client device 1102 may be the validating device that receives a credential representation from the client device 1104, where the credential representation is associated with user 1108. In some implementations, the validating device 1102 may receive the credential using any of the mechanisms that are described with respect to UIs 500, 600 or 700.

At 1204, the validating device sends a request to a validation server, the request including the user credential information and identification data for the validating device. For example, when the validating device 1102 receives the credential representation associated with the user 1108, the credential management application running on the validating device 1102 processes the received credential representation. As discussed previously, in some implementations, the credential management application decodes the received credential representation to obtain a set of alphanumeric characters corresponding to the credential to be validated.

In some implementations, the credential management application executed on the validating device sends a validation request to a remote validation server, such as to server 1130 over the network 1150. The validation request includes the received credential representation, or the decoded set of alphanumeric characters, or some other suitable information corresponding to the credential to be validated. In addition, the validation request includes identification data associated with the validating device. The identification data may be a credential of the validator associated with the validating device (such as the validator 1106).

In some other implementations, the credential management application executed on the validating device performs an off-line validation of the received credential representation. In such implementations, the credential management application does not send a request to any remote validation server. Instead, the credential management application accesses databases of credential information that are stored in local storage coupled to the validating device 1102 and validates the received credential representation based on the information available in the local storage.

Continuing with the description of the implementations where a request is sent to a validation server, at 1206, the validation server receives the request from the validating device. For example, the validation server 1130 receives a validation request from the credential management application running on the validating device 1102, with the request including information corresponding to a credential associated with user 1108, and also identification data (e.g., a credential) associated with user 1104.

The validation server validates the user credential at 1208. For example, the server 1208 examines the credential representation, or the decoded set of alphanumeric characters, or some other suitable information corresponding to the credential to be validated, which is received as part of the validation request from the validating device 1102. Based on the examination, the validation server determines whether the corresponding credential is valid, i.e., the credential is a genuine credential that has been issued by a bona fide credential issuing organization, and that the credential has not expired.

In some implementations, the validation server is able to determine the validity of a credential only when the associated credential issuing organization has registered with the credential management system that manages the validation server and provided the credential management system with information regarding credentials issued by the credential issuing organization. In such implementations, the information provided by the credential issuing organization is stored by the credential management system such that the information is accessible to the validation server for use during validating credentials. For example, the information provided by the credential issuing organization may be stored in storage coupled to the validation server.

At 1210, the validation server also verifies the identification data for the validating device. For example, the validation server 1130 verifies the identification data associated with the validating device 1102 that is provided as part of the validation request received from the validating device.

In some implementations, the identification data may be another credential that is associated with the validator 1106. In such implementations, the validation server 1130 verifies the identification data by validating the credential associated with the validator 1106, in a manner similar to the validation of the validatee's credential representation. Alternatively or in addition, the identification data may be a user identifier associated with the validator 1106.

In some implementations, the validation request from the validating device may include an indication of a user account associated with the validator from which the request is being sent. For example, the validator may be logged in to his or her account with the credential management application on the validating device. The validation request that is then sent includes information identifying the validator's account.

Upon receiving the validation request, the validation server may determine, based on information about the validator in the validator's user account that is accessible to the server (e.g., the validator's user account may be stored in memory coupled to the server), whether the validator is authorized to access the private information corresponding to the validatee. For example, the validation server may determine if the validator's user account includes a credential from the same credential issuing organization as the credential being validated. If an affirmative determination is made, the validation server may allow the validator to access the private information associated with the credential being validated.

Following validating the user's credential representation and verifying the identification data associated with the validating device, at 1212, the validation server accesses instructions regarding what user information to share with the validating device. For example, the validation server 1130 looks up instructions configured by the credential issuing organization associated with the validatee 1108 that specifies what information corresponding to the validatee is public and what information is private.

At 1214, the validation server determines the user information that is to be shared with the validating device based on the accessed instructions. For example, the instructions configured by the credential issuing organization associated with the validator may specify which of the public or private information can be shared with the validator 1106. The instructions may specify that if the identification data associated with the validator 1106 cannot be verified, or is not recognized by the credential issuing organization associated with the validatee 1108 (for example, when a relationship does not exist between the credential issuing organization associated with the validatee 1108 and a credential issuing organization associated with a credential held by the validator 1106), then the public information corresponding to the validatee may be sent to the validating device 1102. However, if the identification data associated with the validator 1106 is verified and recognized by the credential issuing organization associated with the validatee 1108, then the private information corresponding to the validatee may be sent to the validating device 1102.

As discussed previously, in some implementations, the instructions also may specify the amount of public or private information that may be shared with the validating device. In some implementations, the public information may be a subset of the private information. For example, the validated credential may be an employee badge, as shown by the UI 800, with the public information being the validatee's name and company designation. The private information may include the validatee's name and company designation (i.e., the public information) and in addition, it may include the validatee's contact information and permissions for accessing various resources, as shown by the UI 1000.

The validation server sends the determined user information to the validating device at 1216. For example, in one implementation, the validation server 1130 may not successfully verify the identification information associated with the validating device 1102 that is received with the validation request. In such an event, the validation server 1130 sends the public information corresponding to the validatee 1108 to the validating device 1102, following instructions configured by the credential issuing organization associated with the validatee. In another implementation, validation server 1130 may successfully verify the identification information associated with the validating device 1102 and determine that the instructions configured by the credential issuing organization associated with the validatee specify that the validatee's private information may be disseminated to the validating device. In such an event, the validation server sends the private information corresponding to the validatee 1108 to the validating device 1102.

At 1218, user information is received from the validation server and at the validating device in response to the request. For example, the validating device 1102 may receive the public or private information corresponding to the validatee 1108 from the validation server 1130, following successful validation of the credential representation associated with the validatee 1102 and upon verification of the identification data associated with the validating device 1102.

The validating device processes the received user information and performs one or more actions based on the processing at 1220. For example, the credential management application running on the validating device 1102 processes the user information corresponding to the validatee 1108 that is received from the validation server 1130 and performs one or more of the following actions.

In some implementations, the credential management application displays the user information corresponding to the validatee 1108 on a UI shown on the display coupled to the validating device 1102. The user information received from the validation server may be the public information corresponding to the validatee 1108, which may be shown by a UI similar to the UI 800. Alternatively, the user information received from the validation server may be private information corresponding to the validatee 1108, which may be shown by a UI similar to the UIs 900 and 1100.

In some implementations, the credential management application examines the information corresponding to the validatee 1108, and determines whether the validatee 1108 may be granted access to a resource managed by the credential management application. For example, the credential management application may be associated with a third-party application for locking/unlocking a door that controls access to a restricted area. The private information received from the validation server may indicate that the validatee 1108 is authorized to access the restricted area (e.g., the information may be a unique authorization code that unlocks the door to the restricted area). Upon processing the information, the credential management application directs the third-party application to unlock the door to allow the validatee access. Alternatively, the credential management application may give the third-party application the unique authorization code required for the door to be unlocked.

As another example, the credential management application may be associated with a third-party application for controlling access to a web-based messaging system. The private information received from the validation server may include a login name and password for the validatee 1108 to log in to the messaging system. Upon processing the information, the credential management application directs the third-party application to allow the validatee access to the web-based messaging system. Alternatively, the credential management application may give the third-party application the username and password to log the user into the messaging system.

In some implementations, the decision regarding whether to grant the validatee access to the physical or logical resource may not be made by the credential management application itself. Instead, the credential management application may forward the private information corresponding to the validatee that is received from the server to the third-party application associated with the resource. The third-party application may examine the private information and following such examination, make a determination as to whether the private information authenticates the validatee for accessing the resource. Based on this determination, the third-party application may grant or deny the validatee access to the resource.

In some implementations, the determination whether to grant the validatee 1108 access to a resource managed by the credential management application may be made in addition to displaying information associated with the validatee using a UI shown on a display coupled to the validating device. For example, the validating device may show the public information corresponding to the validatee 1108 while processing the private information for granting access. In some implementations, the credential management application may not display the private information, while in other implementations, the private information may be displayed.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions executable by one or more processors which, upon such execution, cause the one or more processors to perform operations comprising:
   receiving, at a validating device and from a client device associated with a first user, a representation of a first credential associated with the first user, wherein the representation of the first credential or an indication that the representation of the first credential is being outputted is presented on a user interface shown on a display coupled to the client device, and wherein the representation of the first credential is selected from the group consisting of an alphanumeric code, an optical machine-readable representation, a sound signal, and a near-field communication signal;
   validating, by the validating device, the representation of the first credential associated with the first user based on data derived from the representation of the first credential associated with the first user and a representation of a second credential of a second user that is associated with the validating device;
   in response to validating the representation of the first credential associated with the first user:
      obtaining, at the validating device, a first set of data associated with the first user based on (i) a verification of the representation of the second credential of the second user associated with the validating device and (ii) a determination, based on a relationship between the first user and the second user, about a level of access provided to the second user for access to information associated with the first user; and
      obtaining, at the validating device, a second set of data associated with the first user independent of verification of the representation of the second credential of the second user that is associated with the validating device, the second set of data being different from the first set of data.

2. The computer-readable medium of claim 1, wherein validating, by the validating device, the representation of the first credential associated with the first user based on data derived from the representation of the first credential associated with the first user and the representation of the second credential of the second user that is associated with the validating device comprises sending, by the validating device and to a validation server, a request to validate the representation of the first credential associated with the first user, the request including data derived from the representation of the first credential associated with the first user and the representation of the second credential of the second user that is associated with the validating device; and
   wherein obtaining, at the validating device, the first set of data associated with the first user and the second set of data associated with the first user comprises receiving, at the validating device and from the validation server, a response comprising the first set of data associated with the first user and the second set of data associated with the first user.

3. The computer-readable medium of claim 1, wherein the first set of data associated with the first user includes identifying information corresponding to the first user that is designated as private.

4. The computer-readable medium of claim 1, wherein the second set of data associated with the first user includes identifying information corresponding to the first user that is designated as public.

5. The computer-readable medium of claim 1, wherein a grouping of the first set of data and a grouping of the second set of data are based on instructions configured by a credential issuing organization that issued the first credential associated with the first user, and
   wherein the instructions configured by the credential issuing organization include instructions directing a determination of what data is to be provided to the validating device based on verifying the representation of the second credential of the second user that is associated with the validating device.

6. The computer-readable medium of claim 1, wherein the instructions cause the one or more processors to perform operations comprising:
   processing the first set of data obtained at the validating device;
   in response to processing the first set of data, determining that the first user is authorized to access a resource associated with the validating device; and
   providing access to the resource based on the determination.

7. The computer-readable medium of claim 6, wherein providing access to the resource comprises unlocking a door based on a key represented within a portion of the first set of data obtained at the validating device.

8. The computer-readable medium of claim 6, wherein providing access to the resource comprises granting access to an account based on a username and password included in the first set of data.

9. The computer-readable medium of claim 6, wherein providing access to the resource in response to processing the first set of data comprises retrieving a document based on a document location encoded within a portion of the first set of data.

10. The computer-readable medium of claim 1, wherein the instructions cause the one or more processors to perform operations comprising:
   presenting, using a display coupled to the validating device, the first set of data and the second set of data obtained at the validating device.

11. A non-transitory computer-readable medium storing instructions executable by one or more processors which, upon such execution, cause the one or more processors to perform operations comprising:
   receiving, at a server and from a validating device, a request to validate a representation of a first credential associated with a first user, the request including data derived from the representation of the first credential associated with the first user and a representation of a second credential of a second user that is associated with the validating device, wherein the representation of the first credential or an indication that the representation of the first credential is being outputted is presented on a user interface shown on a display coupled to a client device corresponding to the first user, and wherein the representation of the first credential is selected from the group consisting of an alphanumeric code, an optical machine-readable representation, a sound signal, and a near-field communication signal;
   validating, by the server, the data derived from the representation of the first credential associated with the first user;

verifying, by the server, the representation of the second credential of the second user that is associated with the validating device;

determining, by the server and based on a relationship between the first user and the second user, a level of access that is provided to the second user for access to information associated with the first user;

based on validating the data derived from the representation of the first credential and verifying the representation of the second credential of the second user that is associated with the validating device, determining, by the server, data associated with the first user that is to be shared with the validating device, wherein the data associated with the first user that is to be shared with the validating device includes a first set of data that is available only when the representation of the second credential of the second user associated with the validating device is verified, wherein the first set of data is selected based on determining the level of access that is provided to the second user for access to information associated with the first user, and a second set of data that is available independent of verifying the representation of the second credential of the validating device; and transmitting, by the server and to the validating device, the data associated with the first user that is to be shared with the validating device.

12. The computer-readable medium of claim 11, wherein determining, by the server, data associated with the first user that is to be shared with the validating device comprises:

accessing, by the server, an instruction configured by a credential issuing organization that issued the first credential associated with the first user, the instruction directing the server to transmit the first set of data when the representation of the second credential of the second user that is associated with the validating device is verified and to transmit the second set of data independent of whether the representation of the second credential of the second user that is associated with the validating device is verified; and based on accessing the instruction configured by the credential issuing organization, obtaining, by the server, the first set of data associated with the first user when the representation of the second credential of the second user that is associated with the validating device is verified and obtaining the second set of data associated with the first user when the representation of the second credential of the second user that is associated with the validating device is not verified.

13. The computer-readable medium of claim 11, wherein the instructions cause the one or more processors to perform operations comprising:

receiving, at the server and from a second validating device, a second request to validate a second representation of the first credential associated with the first user, the second request including data derived from a second representation of the first credential and identification data associated with the second validating device;

validating, by the server, the data derived from the second representation of the first credential;

examining, by the server, the identification data associated with the second validating device;

based on validating the data derived from the second representation of the first credential and examining the identification data associated with the second validating device, determining, by the server, that the second validating device is not enabled to access the first set of data associated with the first user; and in response to determining that the second validating device is not enabled to access the first set of data associated with the first user, sending, by the server and to the second validating device, the second set of data associated with the first user.

14. A system comprising:

instructions stored in a non-transitory computer-readable medium for execution by one or more processors and upon such execution, configured to cause the one or more processors to perform operations comprising:

receiving, at a server and from a validating device, a request to validate a representation of a first credential associated with a first user, the request including data derived from the representation of the first credential associated with the first user and identification data that identifies a second user that is associated with the validating device, wherein the representation of the first credential or an indication that the representation of the first credential is being outputted is presented on a user interface shown on a display coupled to a client device corresponding to the first user, and wherein the representation of the first credential is selected from the group consisting of an alphanumeric code, an optical machine-readable representation, a sound signal, and a near-field communication signal;

validating, by the server, the data derived from the representation of the first credential associated with the first user;

verifying, by the server, the identification data that identifies the second user that is associated with the validating device;

determining, by the server and based on a relationship between the first user and the second user, a level of access that is provided to the second user for access to information associated with the first user;

based on validating the data derived from the representation of the first credential and verifying the identification data that identifies the second user that is associated with the validating device, determining, by the server, data associated with the first user that is to be shared with the validating device, wherein the data associated with the first user that is to be shared with the validating device includes a first set of data that is available only when the identification data that identifies the second user that is associated with the validating device is verified, wherein the first set of data is selected based on determining the level of access that is provided to the second user for access to information associated with the first user, and a second set of data that is available independent of verifying the identification data that identifies the second user that is associated with the validating device; and transmitting, by the server and to the validating device, the data associated with the first user that is to be shared with the validating device.

15. The system of claim 14, wherein determining, by the server, data associated with the first user that is to be shared with the validating device comprises:

accessing, by the server, an instruction configured by a credential issuing organization that issued the first credential associated with the first user, the instruction directing the server to transmit the first set of data when the identification data that identifies the second user that is associated with the validating device is verified and to transmit the second set of data independent of whether the identification data that identifies the second user that is associated with the validating device is verified; and based on accessing the instruction configured by the credential issuing organization, obtaining, by the server, the first set of data associated with the first user when the identification data that identifies the second user that is associated with the validating device is verified and obtaining the second set of data associated with the first user when the identification data that identifies the second user that is associated with the validating device is not verified.

16. The system of claim 14, wherein the instructions cause the one or more processors to perform operations comprising:

receiving, at the server and from a second validating device, a second request to validate a second representation of the first credential associated with the first user, the second request including data derived from a second representation of the first credential and identification data associated with the second validating device;

validating, by the server, the data derived from the second representation of the first credential;

examining, by the server, the identification data associated with the second validating device;

based on validating the data derived from the second representation of the first credential and examining the identification data associated with the second validating device, determining, by the server, that the second validating device is not enabled to access the first set of data associated with the first user; and in response to determining that the second validating device is not enabled to access the first set of data associated with the first user, sending, by the server and to the second validating device, the second set of data associated with the first user.

17. The non-transitory computer-readable medium of claim 1, wherein obtaining the first set of data based on the determination, based on the relationship between the first user and the second user, about the level of access provided to the second user for access to information associated with the first user comprises:

determining the relationship between the first user and the second user based on information included in the first credential and the second credential.

18. The non-transitory computer-readable medium of claim 17, wherein determining the relationship between the first user and the second user comprises determining that a same credential issuing organization issued the first credential to the first user and the second credential to the second user.

19. The non-transitory computer-readable medium of claim 17, wherein determining the relationship between the first user and the second user comprises determining that a business relationship exists between a first organization that issued the first credential to the first user and a second organization that issued the second credential to the second user.

20. The non-transitory computer-readable medium of claim 1, wherein obtaining the first set of data based on the determination about the level of access provided to the second user to information associated with the first user comprises:

determining an identity of the first user based on the first credential;

determining an identity of the second user based on the second credential; and determining, based on the identities of the first user and the second user, the level of access provided to the second user to information associated with the first user.

* * * * *